United States Patent [19]
Yamanaka et al.

[11] Patent Number: 6,121,379
[45] Date of Patent: Sep. 19, 2000

[54] PROCESSES FOR PRODUCING POLYMERS HAVING FUNCTIONAL GROUPS

[75] Inventors: Yoshimichi Yamanaka, Toyonaka; Yoshikuni Deguchi, Kobe; Naoki Furukawa, Himeji; Shigeru Hagimori, Kobe; Shun Wachi, Takasago, all of Japan

[73] Assignee: Kaneka Corporation, Osaka, Japan

[21] Appl. No.: 09/077,374

[22] PCT Filed: Nov. 27, 1996

[86] PCT No.: PCT/JP96/03461

§ 371 Date: Aug. 6, 1998

§ 102(e) Date: Aug. 6, 1998

[87] PCT Pub. No.: WO97/19962

PCT Pub. Date: Jun. 5, 1997

[30] Foreign Application Priority Data

Nov. 27, 1995 [JP] Japan ................................. 7-332814
Nov. 27, 1995 [JP] Japan ................................. 7-332815

[51] Int. Cl.$^7$ ..................................... C08L 23/22
[52] U.S. Cl. ............................. 525/106; 525/100; 528/12; 528/15; 528/25; 528/31; 524/848; 524/862
[58] Field of Search ..................... 525/106, 100; 528/12, 25, 31, 15; 524/848, 862

[56] References Cited

U.S. PATENT DOCUMENTS

| | | | |
|---|---|---|---|
| 4,803,244 | 2/1989 | Umpleby | 525/105 |
| 4,808,664 | 2/1989 | Saam | 525/106 |
| 4,879,330 | 11/1989 | Yoshino et al. | 524/740 |
| 5,359,111 | 10/1994 | Kleyer et al. | 556/479 |
| 5,447,990 | 9/1995 | Noda et al. | 525/106 |

FOREIGN PATENT DOCUMENTS

| | | |
|---|---|---|
| 0 320 259 A2 | 6/1989 | European Pat. Off. . |
| 0 458 336 A2 | 11/1991 | European Pat. Off. . |
| 0 533 170 A1 | 3/1993 | European Pat. Off. . |
| 0 658 575 A2 | 6/1995 | European Pat. Off. . |
| 2 110 706 | 6/1983 | United Kingdom . |

*Primary Examiner*—Margaret G. Moore
*Attorney, Agent, or Firm*—Pollock, Vande Sande & Amernick

[57] ABSTRACT

A process for producing organic polymers having silicon containing groups in high yields comprises hydrosilylating a polymer having unsaturated groups with a hydrosilicon compound. This process includes keeping the polymer and a solvent in an inert gas environment and introducing oxygen into the reactor just before starting the hydrosilylation reaction.

8 Claims, 20 Drawing Sheets

PROCESSES FOR PRODUCING POLYMERS HAVING FUNCTIONAL GROUPS

TECHNICAL FIELD

The present invention relates to a process for preparing an organic polymer having silicon-containing groups.

BACKGROUND ART

A group containing one or more silicon atoms bound to hydrolyzable groups (e.g. $(CH_3O)_2Si(CH_3)$—) is hydrolyzed into silanol when moisture exists, and then forms siloxane bonds. These groups can be called crosslinkable silyl groups. A polymer having crosslinkable silyl groups can be crosslinked and cured by forming siloxane bonds in the presence of moisture. It can be used as sealing compounds and adhesives.

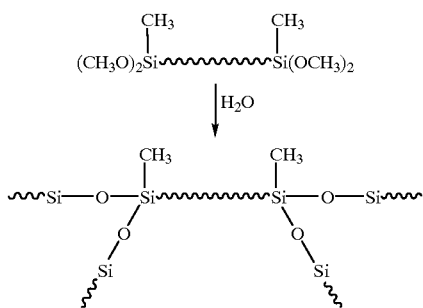

It is known that the crosslinkable silyl groups-having polymer can be produced by subjecting a polymer having unsaturated groups (unsaturated polymer) to hydrosilylation reaction with a hydrosilicon compound having hydrolyzable groups.

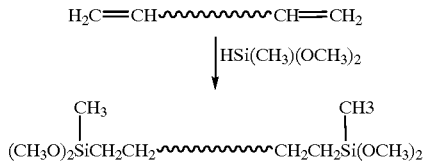

The hydrosilylation reaction is not only used for the production of the crosslinkable silyl groups-having polymer, but is also generally used for the production of a polymer having silicon-containing groups.

In the hydrosilylation reaction, a platinum compound and oxygen are generally used as a catalyst and a promoter, respectively (Onopchenko. A. et al, J. Org. Chem., 52, 4118, (1987), Lewis. L. N. et al, J. Am. Chem. Soc., 112, 5998, (1990) and U.S. Pat. No. 5,359,111). When it is carried out without oxygen but with an inert gas such as nitrogen or helium, catalyst activity is markedly lowered in the reaction to thereby cause hydrosilylation reaction rate extremely slow. Thus, there arise a possibility that it takes several days to complete the reaction. Consequently, problems may occur, such as extremely lowered productivity and lowered content ratio of the silicon-containing groups in the final polymer.

The hydrosilylation reaction using oxygen as a promoter is used for reaction with a low-molecular-weight compound, for example reaction of 1-alkene including 1-octene with a silane compound such as alkylsilane, dialkylsilane or tri- alkylsilane including triethylsilane, methyldioctylsilane, trioctylsilane or dioctylsilane; reaction of triethylsilane with vinyltrimethylsilane or vinyltrichlorosilane; reaction of cyclohexene with methyldichlorosilane; reaction of 1-hexene or cyclohexene with methyldichlorosilane; reaction of 1-hexene with dimethoxymethylsilane; reaction of 1,1,1,2,3,3,3-heptamethyltrisiloxane with 1-hexene or trans-2-hexene; reaction of triethylsilane with trans-2-hexene; reaction of trichlorosilane with 1,5-hexadiene; and the like.

When a polymer having unsaturated groups is hydrosilylated with a hydrosilicon compound; however, the yield may not increase even the reaction is carried out in the presence of oxygen. This tendency is accelerated when an organic solvent is used to lower the reactant's viscosity.

The invention has an object to provide a process for producing an organic polymer having silicon-containing groups in a high yield by hydrosilylating an unsaturated groups-having polymer with a hydrosilane compound in the presence of oxygen.

The invention has another object to provide an effective device for producing an organic polymer having silicon-containing groups by hydrosilylating an unsaturated groups-having polymer with a hydrosilane compound.

DISCLOSURE OF THE INVENTION

The objects of the present invention are accomplished by either of the following inventions or by combinations thereof.

1. A process for preparing an organic polymer having silicon-containing groups by subjecting a polymer having an unsaturated group(s) to hydrosilylation reaction with a hydrosilicon compound, which comprises mixing the polymer having unsaturated groups with a solvent in the presence of an inert gas and introducing oxygen into the reactor.

2. A process for preparing an organic polymer having silicon-containing groups by subjecting a polymer having unsaturated groups to hydrosilylation reaction with a hydrosilicon compound in the presence of a solvent, oxygen and an antioxidant.

3. A process for preparing an organic polymer having silicon-containing groups by subjecting a polymer having unsaturated groups to hydrosilylation reaction with a hydrosilicon compound, which comprises using a mixing vessel equipped with a impeller, the impeller height and the mixing vessel height being at a ratio of from 0.1 to 1.0, the impeller width and the inside diameter of mixing vessel being at a ratio of from 0.4 to 0.95, the projection area of the impeller in the vessel and that of the reaction mixture being at a ratio of 0.35 to 0.8.

A polymer having at least one unsaturated group such as alkenyl group in a molecule is used in the present invention. The unsaturated group is preferably a group having activity to hydrosilylation reaction, for example vinyl groups. A polymer having unsaturated groups such as vinyl groups on both molecular ends is used as a material for photo-curing resin, UV curing resin, electron beam curing resin, sealing compound for electronics, adhesive, modifier, coating compound, sealing compound for construction, etc.

The organic polymer having silicon-containing groups which is produced by the processes of the invention is generally used as a crosslinkable polymer. In this case, this polymer is used for the applications such as adhesive, pressure sensitive adhesive, paint, sealing compound or waterproofing agent. The required properties of crosslinked and cured products are generally weatherability, heat resistance, moisture proofing, and so forth. Since a saturated hydrocarbon polymer shows excellent weatherability and heat resistance, it is preferably used as the polymer having unsaturated groups in the invention. Examples of such a polymer are hydrogenated polyisoprene, polyisobutylene, and the like. The polyisobutylene is particularly suitable for applying the invention.

The polyisobutylene used in the invention can be a homopolymer or a copolymer. In case of using the copolymer, an isobutylene-unit proportion in the copolymer is preferably not less than 50 mol %, more preferably not less than 80 mol %, and most preferably not less than 90 mol %. The other component in the copolymer can be selected optionally from monomers copolymerizable with isobutylene, especially from cationic polymerizable monomers. Examples of these monomers are olefins having 3 to 12 carbon atoms, conjugated dienes, non-conjugated dienes, vinyl ethers, aromatic vinyl compounds, norbornenes, cyclopentadienes, dicyclopentadienes, vinylsilanes, etc.

Specific examples of the cationic polymerizable monomers copolymerizable with isobutylene are propene, 1-butene, 2-butene, 2-methyl-1-butene, 3-methyl-1-butene, pentene, hexene, cyclohexene, vinylcyclohexene, 5-ethylidenenorbornene, 5-propylidenenorbornene, butadiene, isoprene, cyclopentadiene, methyl vinyl ether, ethyl vinyl ether, isobutyl vinyl ether, vinylcarbazole, methoxystyrene, ethoxystyrene, t-butoxystyrene, hexenyloxystyrene, styrene, α-methylstyrene, methylstyrene, dimethylstyrene, chloromethylstyrene, chlorostyrene, indene, β-pinene, vinyltrichlorosilane, vinylmethyldichlorosilane, vinyldimethylchlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, γ-methacryloyloxypropyltrimethoxysilane, γ-methacryloyloxypropylmethyldimethoxysilane, and so on. Among these examples, preferable are propene, 1-butene, 2-butene, cyclopentadiene, 5-ethylidenenorbornene, isobutyl vinyl ether, methoxystyrene, styrene, and the like. These components can be used alone or in combination thereof.

It is known that an isobutylene polymer containing chlorine atom bound to tertiary carbon at the molecular end is produced by a method called inifer method (U.S. Pat. No. 4,276,394), which comprises cation polymerizing isobutylene using a halide such as 4,4-bis(α-chloroisopropyl) benzene or 1,3,5-tris(α-chloroisopropyl)benzene as an initiator, and using Lewis acid such as trichloroboron as a catalyst. A method using allyltrimethylsilane (Japanese Kokai Publication Sho-63-105005) and a method using non-conjugated dienes (Japanese Kokai Publication Hei-4-288309) are known as methods for introducing vinyl groups to halogen-terminated isobutylene polymer produced by inifer method.

The number average molecular weight of the above-mentioned isobutylene polymer is preferably 500 to 200,000, more preferably 1,000 to 100,000, and most preferably 3,000 to 50,000. When the number average molecular weight is less than 500, the required properties may not reach the satisfied level. When it exceeds 200,000, the isobutylene polymer is turned to solid; therefore, the reaction workability tends to be deteriorated.

The hydrosilicon compound used in the invention is a compound having Si—H group. A hydrosilicon compound whose silicon atom is bound to hydrolizable groups is used to obtain the polymer having crosslinkable silyl groups. An example of such a hydrosilicon compound is shown in the general formula (1):

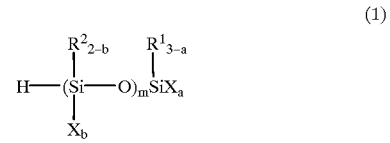

(wherein each of $R^1$ and $R^2$ is an alkyl group having 1 to 20 carbon atoms, an alyl group having 6 to 20 carbon atoms or $(R')_3SiO$— (R' is a monovalent hydrocarbon having 1 to 20 carbon atoms, and three R's can be the same or different); X is a hydroxyl group, hydrogen atom, or hydrolyzable group such as alkoxy group or acyloxy group. When two or more Xs are bound to Si atom, they can be same or different; a is an integer of 0 to 3; b is an integer of 0 to 2; and m is an integer of 0 to 18.)

The specific examples of the hydrosilicon compound can include, but is not limited to, halogenated silanes such as trichlorosilane, methyldichlorosilane, dimethylchlorosilane and trimethylsiloxydichlorosilane; alkoxysilanes such as trimethoxysilane, triethoxysilane, dimethoxymethylsilane, methoxydimethylsilane, dimethoxyphenylsilane and 1,3,3,5,5,7,7-heptamethyl-1,1-dimethoxytetrasiloxane; acyloxysilanes such as methyldiacetoxysilane and trimethylsiloxy-methylacetoxysilane; hydrosilanes having two or more Si—H bonds in a molecule such as dimethylsilane, trimethylsiloxymethylsilane, 1,1,3,3-tetramethyldisiloxane and 1,3,5-trimethylcyclotrisiloxane; alkenyloxysilanes such as methyldi(isopropenyloxy)silane; and the like. Among these examples, chlorosilanes such as trichlorosilane and methyldichlorosilane are preferred to get high activity on hydrosilylation reaction, and alkoxysilanes such as trimethoxysilane and dimethoxymethylsilane are preferred to obtain the resulting polymer having crosslinkable silicon groups with mild reactivity (hydrolyzability).

In case of using a hydrosilicon compound having two or more Si—H bonds in a molecule, the molecular weight of the polymer can be increased 2 or 3 times by binding two or more polymer molecules to one hydrosilicon compound molecule. The organic polymer having silicon-containing groups can also be obtained by increasing the molecular weight of the polymer in the above manner.

The amount of the hydrosilicon compound used in the invention is not particularly limited; however, the amount is preferably between 0.2 and 20 mol based on 1 mol of unsaturated group in the polymer. From the viewpoint of cost, it is more preferably between 0.5 and 10 mol, most preferably between 0.8 and 3 mol.

The timing for introducing the hydrosilicon compound is not particularly limited. This compound may be introduced after mixing the polymer with additives such as a catalyst and solvent in an inert gas atmosphere before starting the reaction. The compound may also be introduced into the reaction system containing oxygen by means of oxygen displacement after mixing the polymer with additives such as a catalyst and solvent in an inert gas atmosphere.

The solvent is used in the invention in order to lower the viscosity of the reactant. The solvent can preferably include, but is not particularly limited to, aliphatic hydrocarbon such as hexane and heptane. When the solvent is used for lowering viscosity, it is preferably used in an amount of 0.1 to 500 parts by weight relative to the polymer.

The solvent in the invention can include a plasticizer. It is convenient to use a plasticizer in the reaction when the objective polymer having silicon-containing groups is used with plasticizer. The molecular weight of the plasticizer is preferably between 100 and 1,000, more preferably between 200 and 800. When the number average molecular weight of the plasticizer is less than 100, the boiling point of the plasticizer may be lowered. When it exceeds 1,000, workability may be deteriorated because of high viscosity. Moreover, a plasticizer is preferred which has good compatibility with the polymer and relatively high boiling point and which does not inhibit the reaction or barely inhibits the reaction. The preferred example is a petrolic softening agent having molecular weight of 200 to 800 when the main chain skeleton of the polymer is comprised of saturated hydrocarbon such as polyisobutylene. The petrolic softening agent can include, for example, a paraffin plasticizer and/or a plasticizer comprising 50 to 90% of paraffin (CP), 10 to 50% of naphthene (CN), and 1% or less of aroma (CA); and particularly a plasticizer comprising 60 to 80% paraffin (CP), 20 to 40% of naphthene (CN), and 1% or less of aroma (CA), these percentages being obtained by n-d-M method. Said n-d-M method is a method for calculating paraffin content or naphthene content by substitute values of refractive index (n), density (d) and molecular weight (M) for empirical formula of the n-d-M method (Ikebe Kiyoshi et al. Petrolic Hydrocarbon Chemistry, 2ed volumes, Kyoritsu Syuppan). When the paraffin content or naphthene content is out of the above-mentioned range, the plasticizer tends to be oxidized and deteriorated. Further, the aroma content of the plasticizer calculated by ring analysis is preferably 1% or less. Said ring analysis means to calculate the aroma content from the formula below.

The aroma content in the plasticizer (%)=0.68×[AP]

In the formula, [AP] is a difference between the measured aniline point and the calculated aniline point obtained from the measured specific refraction ($r^{20}_D$) and the molecular weight (M) of the plasticizer (Ikebe Kiyoshi et al. Petrolic Hydrocarbon Chemistry, 2ed volumes, Kyoritsu Syuppan). When the aroma content is more than 1%, the weatherability of the product is deteriorated. The more preferable aroma content is not more than 0.1%.

The plasticizer can preferably include hydrocarbon compounds such as polybutene, hydrogenated polybutene, α-methylstyrene oligomer, biphenyl, triphenyl, triaryldimethane, alkylenetriphenyl, liquid polybutadiene, liquid hydrogenated polybutadiene and alkyldiphenyl; adipate esters such BAA-15 (Daihachi Chemical), P-103, W-320 (Dainippon Ink and Chemicals) and PN-150 (Adeka Argus Chemical): trimellitate esters such as TOTM, TITM (New Japan Chemical) and W-700 (Dainippon Ink and Chemicals); petrolic process-oils such as NS-100, NM-26, NP-24, PS-32, PW-32 and PX-32 (Idemitsu Kosan); alkylbenzenes such as Alken-68 (Nippon Petroleum Detergent), esters such as KE-828 (Arakawa chemistry), BF-1000 (Adeka Argus Chemical), DOTP (New Japan Chemical); and so on. Alken-68, PS-32, PW-32, PX-32, DOTP, NS-100. TOTM and the like are preferred because of small weight loss by heat.

When the plasticizer is used as a solvent, its amount may be adjusted based on the reactant's viscosity and the plasticizer amount necessary for the application of the obtained polymer. Generally, it is preferably used in an amount of from about 10 to about 100 parts by weight based on 100 parts by weight of the polymer having unsaturated groups.

The effect of the invention is eminently emphasized when a solvent is used. This is presumably because while substrates such as carbonyl compounds is formed by oxidation of a solvent with molecular oxygen for inhibiting hydrosilylation reaction, this formation may be blocked by keeping the reaction system in an inert gas atmosphere before hydrosilylation reaction or by using antioxidant. The detailed mechanism is still unknown.

The temperature at which the polymer is mixed with the solvent is not particularly limited, but it is preferably below the boiling point of the solvent used from the viewpoint of safe operation. The range of the temperature is preferably between 10 and 300° C., and more preferably between 30 and 200° C.

The inert gas used in mixing the polymer with the solvent i: preferably helium, neon, argon or nitrogen. A small quantity of oxygen may be included in this system. In this case, the oxygen content is preferably not more than 0.01%, and more preferably not more than 0.001%. Moreover, the inert gas is preferably used in mixing the polymer with a catalyst, an antioxidant or the hydrosilicon compound prior to the reaction. These additives can be mixed with the polymer and the solvent at the same time, or after mixing the solvent with the polymer.

In the invention, oxygen is generally introduced into the reaction system in a gaseous form. The introduction can be either bubbling it into the reaction solution or blowing it into the gaseous phase of the reactor. The oxygen can be supplied continuously or intermittently. Besides, it may be satisfactory that a certain content of oxygen is present in the gaseous phase of the reactor. The oxygen content used in the invention is not particularly limited, but the condition in the reactor is preferably not to form explosive composition. Generally, the oxygen content in the gaseous phase of the reactor is preferably out of explosive limit oxygen content of the hydrosilicon compound.

The explosive composition and the explosive limit oxygen content herein are determined from the testing results. An example of the said test is whether ignition source (such as heat source by Nichrome wire, a microwave spark) will or will not cause explosion with the various compositions of oxygen/the inert gas/the hydrosilicon compound. An example of the testing results in which the said hydrosilicon compound is dimethoxymethylsilane is shown in FIG. 19. In FIG. 19, the triangular diagram shows the result at 25° C. and under a normal pressure, slant line-area represents the explosion composition area, and point A represents the explosive limit oxygen content.

The explosive limit oxygen content under the conditions of a temperature of 90° C. and a pressure of 5 kg/cm$^2$G is also shown in FIG. 20.

When the oxygen content is low, it is easy to be out of explosion range. If the oxygen content is extremely low, however, the reaction time is increased because of low reaction rate. The oxygen content used is preferably not less than 0.1%, and more preferably not less than 1%.

The inert gas mixed with air or oxygen is preferably argon, helium, neon, xenon or nitrogen.

The pressure during the reaction is preferably higher than atmospheric pressure. This is because when the reaction is conducted with a gaseous phase oxygen content out of explosion range, the higher a pressure is in the gaseous phase, the higher oxygen content can be used in the reaction solution. As a result, hydrosilylation reaction proceeds smoothly without a risk of explosion. Generally, the pressure is preferably between 0 and 50 kg/cm$^2$G, more preferably between 0 and 20 kg/cm$^2$G, and most preferably between 0 and 10 kg/cm$^2$G.

Oxygen can be introduced into the reactor by regulating gas containing a certain content of oxygen with a bomb or regulator and then introducing it, or by introducing with controlling each flow rate or pressure of the inert gas and air or oxygen.

The timing for introducing oxygen into the reactor is not particularly limited, but the preferable timing is Just before starting the reaction. More preferable timing is after mixing the polymer having unsaturated groups with a platinum catalyst.

As for oxygen supplement, oxygen may not be supplied into the closed reactor after introducing oxygen until the reaction is finished, or oxygen may be supplemented when the reaction activity is extremely lowered by consumption of oxygen for the reaction. As for a supplemental method, a certain content of oxygen may be supplemented after a gaseous phase pressure of the reactor is turned back to atmospheric pressure. A high content of oxygen may also be introduced into the closed system. Oxygen may be further introduced by raising a system pressure stepwise. This oxygen supplement is carried out intermittently, but can be continuously.

The antioxidant used in the invention can include phenolic antioxidant functioning as a radical polymerization terminator such as 2,6-di-tert-butyl-p-cresor, 2,6-di-tert-butylphenol, 2,4-di-methyl-6-tert-butylphenol, 2,2'-methylenebis(4-methyl-6-tert-butylphenol), 4,4'-butylydenebis(3-methyl-6-tert-butylphenol), 4,4'-thiobis(3-methyl-6-tert-butylphenol), tetrakis{methylene-3(3,5-di-tert-butyl-4-hydroxyphenyl)propionate}methane, 1,1,3-tris(2-methyl-4-hydroxy-5-tert-butylphenyl)butane, among others. An amine antioxidant, which functions as a radical polymerization terminator, can be used, for example, phenyl-β-naphrylamine, α-naphtylamine, N,N'-di-sec-butyl-p-phenylenediamine, phenothiazine, N,N'-diphenyl-p-phenylenediamine, among others. However, the antioxidant used in the invention is not limited to these examples.

The proportion of the antioxidant used is preferably between 0.0001 and 10 parts by weight relative to 100 parts by weight of the polymer, more preferably between 0.005 and 0.5 parts by weight, and most preferably between 0.01 and 0.5 parts by weight. If the proportion of the antioxidant is less than 0.0001 part by weight, the effect expressed by the antioxidant may be deteriorated. If the proportion of the antioxidant exceeds 10 parts by weight, the reaction rate may be slowed.

When the antioxidant is used, the polymer may be mixed with a solvent in the presence of oxygen, but oxygen is preferably introduced into the reactor just before starting the reaction. It is most preferable that oxygen is introduced into the reactor after mixing the polymer having unsaturated groups with a platinum catalyst.

A platinum catalyst is preferred for the hydrosilylation reaction of the invention. Supported platinum metal, a platinum compound or a platinum complex is used suitably as said platinum catalyst. As specific examples, there can be mentioned simple platinum: supported platinum metal wherein solid platinum is supported on a career such as alumina, silica or carbon black; platinum compounds such as chloroplatinic acid or a complex of chloroplatinic acid with alcohol, aldehyde, ketone or the like; a platinum complex such as platinum-olefin complex (e.g. $Pt(CH_2=CH_2)_2(PPh_3)$, $Pt(CH_2=CH_2)_2Cl_2$), platinum-vinylsiloxane complex ($Pt[(vinyl)Me_2SiOSiMe_2(vinyl)]$), $Pt[Me(vinyl)SiO]_4$), platinum-phosphine complex ($Pt(PPh_3)_4$, $Pt(PBu_3)_4$), platinum-phosphite complex ($Pt(P(OPh)_3)_4$), among others. There can be also mentioned dicarbonyldichloroplatinum, the platinum-hydrocarbon complex disclosed by Ashby in U.S. Pat. No. 3,159,601 and U.S. Pat. No. 3,159,662, and the platinum-alcoholate complex disclosed by Lamoreaux in U.S. Pat. No. 3,220,972. In addition, the platinum chloride-olefin complex disclosed by Modic in U.S. Pat. No. 3,516,946 can be used in the invention.

These catalysts can be used alone or in admixture thereof. From the viewpoint of reaction activity, preferred are chloroplatinic acid, platinum-olefin complex, platinum-acetylacetonate complex and platinum-vinylsiloxane complex. The amount of the catalyst used is not particularly limited; however, it is preferably between $10^{-1}$ and $10^{-8}$ mol and more preferably between $10^{-3}$ and $10^{-6}$ mol, relative to 1 mol of unsaturated groups in the polymer having unsaturated groups. When it is less than $10^{-8}$ mol, hydrosilylation reaction may not proceed enough. In addition, it is not preferable to exceed $10^{-1}$ mol from the viewpoint of cost, corrosiveness or formation of by-product.

Moreover, the catalyst used is preferably dissolved in an inert solvent for stabilizing. Preferred examples of said solvent are aromatic hydrocarbon solvents such as benzene, toluene, xylene; polar solvents such as alcohol, various glycols, esters; among others.

The reaction temperature is not particularly limited. The most suitable temperature depends on catalyst content and property of reactant, but it is generally in the range of 30 to 200° C. and preferably in the range of 50 to 120° C.

The type of the reactor is not particularly limited. In the system consuming much oxygen, batch method or semi-batch method is preferred because the reaction can proceed in the presence of gas-liquid interface and under an oxygen atmosphere. In the system consuming oxygen a little, continuous method can be used in addition to batch method or semi-batch method.

A reactor having an impeller is suitable for use among the reactors. It is important in the invention to select a suitable impeller when the reaction solution has high viscosity, namely, 10 cp or more. A preferable impeller satisfies the following three conditions. The impeller height and the mixing vessel height are in a ratio of from 0.1 to 1.0. The impeller width and the inside diameter of the mixing vessel are in a ratio of from 0.4 to 0.95. The projection area of the impeller and that of the mixing vessel are in a ratio of from 0.35 to 0.8. As examples of said impeller satisfying these conditions, there can be mentioned Anchor blade, Paddle blade, Helicalribbon blade, Maxblend blade (Sumitomo Jukikai Kogyo Co.), Fulzone blade (Shinkou Pantek Co.), Supermix blade (Satake Co.), Glasses type blade, Horizontal blade, among others.

In using the above-mentioned impeller, the surface position of the reaction solution may be above or under the upper end of the impeller. When the surface position of the reaction solution is under the upper end of the impeller, more gas is involved in the reaction solution. The reaction then proceeds faster than when the surface position of the reaction solution is above the upper end of the impeller. Thus, the surface position of the reaction solution against the impeller in the reactor affects reaction rate of this reaction.

The mixing vessel can be equipped with one or more baffles for effective mixing or reaction.

In the invention, power required for mixing [$kW/m^3$], which means the power per volume of the reaction solution (including the case that reactants are dissolved in a solvent), is preferably 0.5 or more, and more preferably 1.0 or more.

Explanation of the Marks 1. mixing vessel
2. the rotation axis of impeller
3. impeller
4. baffle

BEST MODE FOR CARRYING OUT THE INVENTION

EXAMPLES

The conversions (X) in these examples was calculated from the formula below using the absorption area of vinyl group in vinyl-terminated isobutylene polymer as measured by FT-IR (Shimadzu DR-8000).

$$X = 1 - S_t/S_0$$

$S_0$: vinyl peak area before reaction $S_t$: vinyl peak area at reaction time t The content of carbonyl products produced during the reaction [CO] was obtained as follow. First, n-capric aldehyde, having 10 carbon atoms for a long chain carbonyl compound, was dissolved in a plasticizer to prepare a solution in various contents, and then the carbonyl absorption was measured by IR. From those measurements, the relational expression of the peak area of the carbonyl absorption (Sco) with the carbonyl content (Cco) was obtained. With this relational expression, the content of carbonyl product [CO] in the hydrosilylation reaction was calculated.

$$Cco(X\ 10^{-2}\ mmol/g) = 0.437 + 0.0629 \times Sco$$

EXAMPLE 1

Figure 1:
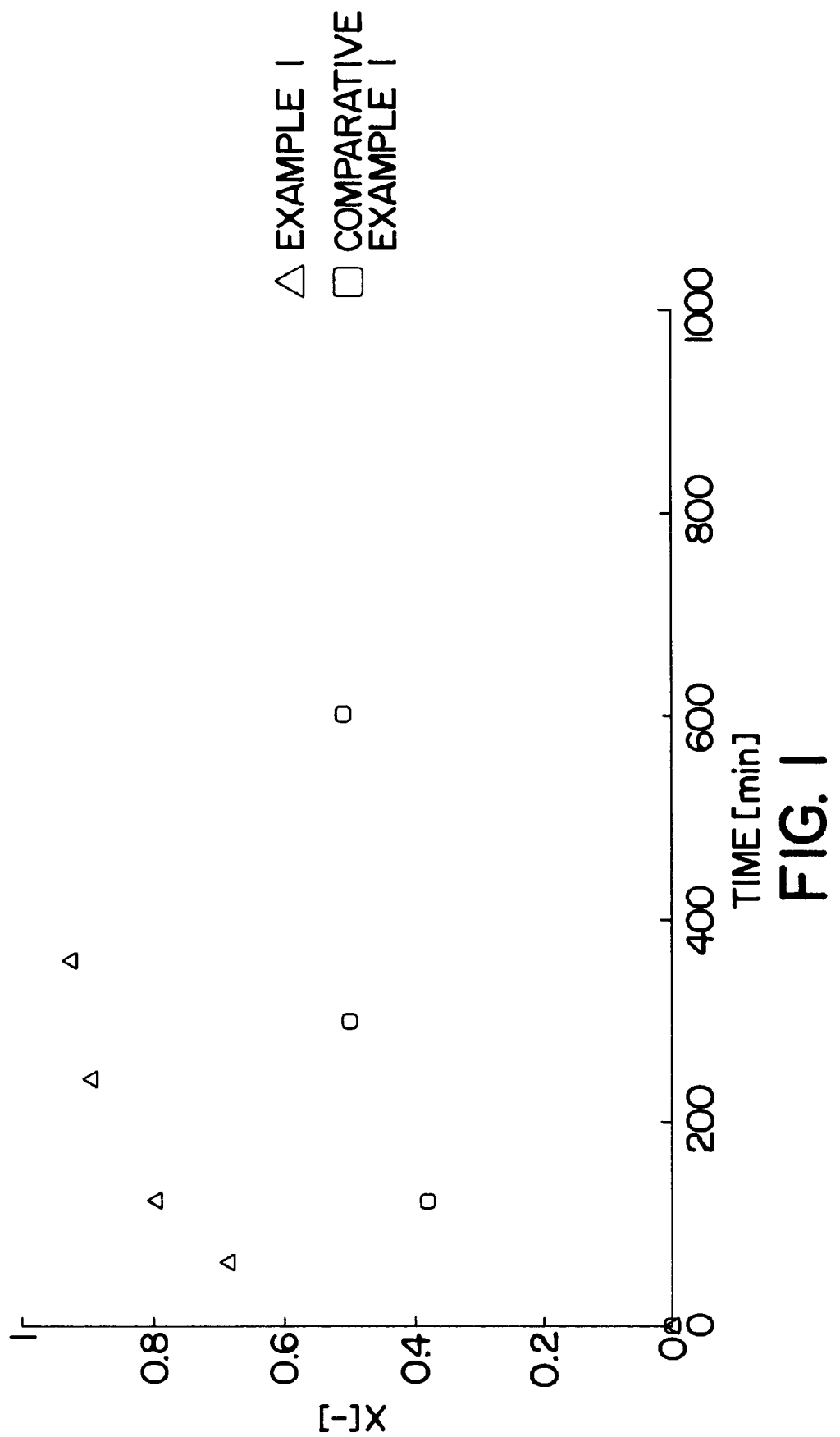
FIGS. 1 to 9 represent graphs showing the relation of reaction time with conversion in various conditions.

To a four-necked separable flask with 500 ml of inner volume were added about 50 g of isobutylene polymer containing vinyl groups on its ends at a proportion of about 90% and having a molecular weight of about 10,000 and 25 g of hydrocarbon plasticizer PS-32 (Idemitsu Kosan). They were mixed and dissolved for 1 hour at inner temperature 90° C. under a nitrogen atmosphere. To the reactor was added $2 \times 10^{-4}$ mol of platinum-vinylsiloxane complex catalyst ($8.31 \times 10^{-6}$ mmol/µl of xylene solution) per mol of vinyl groups in the isobutylene polymer. Air diluted with nitrogen containing 8.0% of oxygen was introduced into the gaseous phase of the reactor. With keeping an inner temperature at 75° C., 1.5 mol of dimethoxymethyl silane per mol of vinyl groups in the isobutylene polymer was introduced into the reactor through the dropping funnel to start the reaction. This conversion of the reaction is shown in FIG. 1.

COMPARATIVE EXAMPLE 1

The experiment was conducted with the same conditions as example 1 except that the isobutylene polymer and PS-32 were mixed in an air atmosphere. This conversion is shown in FIG. 1. FIG. 1 shows that the conversion increases when the mixing is conducted under a nitrogen atmosphere than when the mixing is conducted under an air atmosphere.

EXAMPLE 2

Figure 2:
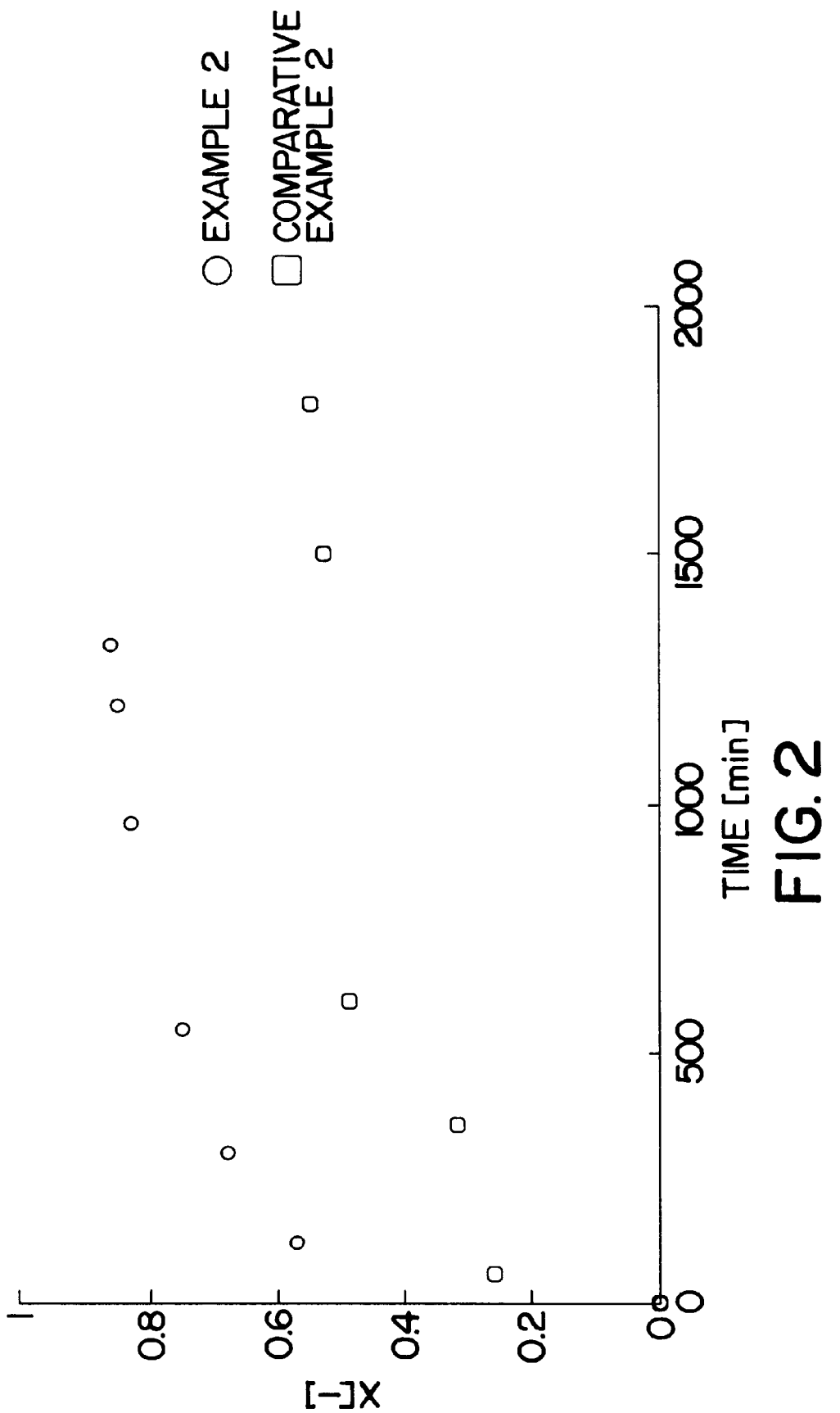

About 40 kg of isobutylene polymer containing vinyl groups at its ends at the proportion of about 95% and having a molecular weight of bout 10,000 was mixed and dissolved with 12 kg of hydrocarbon plasticizer PS-32 (Idemitsu Kosan) in the reactor with an inside volume of 100 L under an nitrogen atmosphere for 1 hour at an inner temperature of 110° C. Into the reactor was added $2 \times 10^{-4}$ mol of platinum-vinylsiloxane complex catalyst ($8.31 \times 10^{-6}$ mmol/µL of a xylene-diluted solution) per mol of vinyl groups in the isobutylene polymer. Nitrogen-diluted air was then introduced into the reactor to adjust the oxygen content of the vapor phase to 8.0%. Into the reactor was introduced 1.5 mol of dimethoxysilane per mol of vinyl groups in the isobutylene polymer through the dropping funnel to start the reaction. Just after starting the reaction, the pressure of the gaseous phase turned to 4 kg/cm$^2$G to continue the reaction. At 9 hours and 16 hours after starting the reaction, respectively, the pressure of the gaseous phase was turned to an atmospheric pressure and then turned back to 4 kg/cm$^2$G with 8%-oxygen containing gas to continue the reaction. This conversion is shown in FIG. 2.

COMPARATIVE EXAMPLE 2

The experiment was conducted with the same conditions as Example 2 except two conditions as follows. The isobutylene polymer were mixed and dissolved with PS-32 under an air atmosphere. At each of 5, 10, 15 and 20 hours after starting the reaction, the pressure in the gaseous phase was turned to an atmospheric pressure and then turned back to 4 kg/cm$^2$G with 8% oxygen-containing gas to continue the reaction. This conversion is shown in FIG. 2. FIG. 2 shows that the conversion rate of the reaction in the case of mixing and dissolving under nitrogen atmosphere is higher than that in the case of mixing and dissolving under air atmosphere.

EXAMPLE 3

Figure 3:
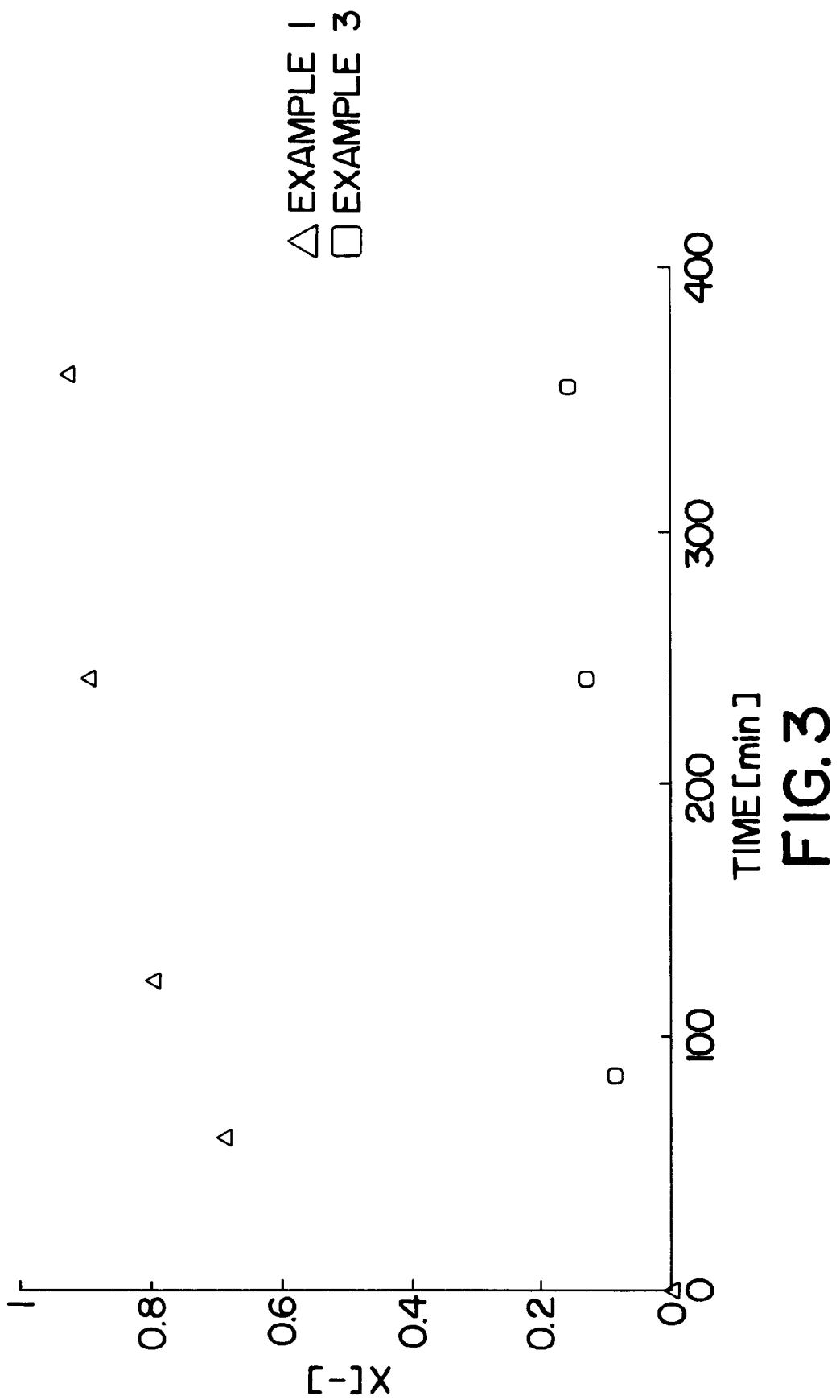

The reaction was conducted with the same conditions as example 1 except that the content of oxygen in vapor phase was 0.01%. The conversion rate of the reaction was shown in FIG. 3. FIG. 3 shows that the reaction proceeds with keeping low conversion rate in the case of low oxygen content.

EXAMPLE 4

About 100 g of isobutylene polymer containing vinyl groups at the proportion of about 95% at its ends, having a molecular weight of about 10,000 and 50 g of PS-32 (Idemitsu Kosan) as plasticizer were added to the pressure durable glass reactor with jacket of 500 ml of inner volume and they were mixed and dissolved for 1 hour at inner temperature 75° C. under nitrogen atmosphere. After $2 \times 10^{-4}$ mol of a platinum-vinylsiloxane complex catalyst ($8.31 \times 10^{-6}$ mmol/µL in xylene solution) per mol of vinyl group in isobutylene polymer was added to the reactor, air diluted with nitrogen containing 8.0% of oxygen was introduced into the vapor phase of the reactor, the inner pressure in the reactor was adjusted to 0 kg/cm$^2$G. After that, the reaction was started by introducing 1.5 mol of dimethoxysilane per mol of vinyl group in isobutylene polymer into reactor through the dropping funnel. The conversion rate of the reaction is shown in FIG. 4.

EXAMPLE 5

The experimental conditions were the same as that of example 4 except adjusting the inner pressure in the reactor to 2 kg/cm$^2$G. The conversion rate of the reaction is shown in FIG. 4.

Figure 4:
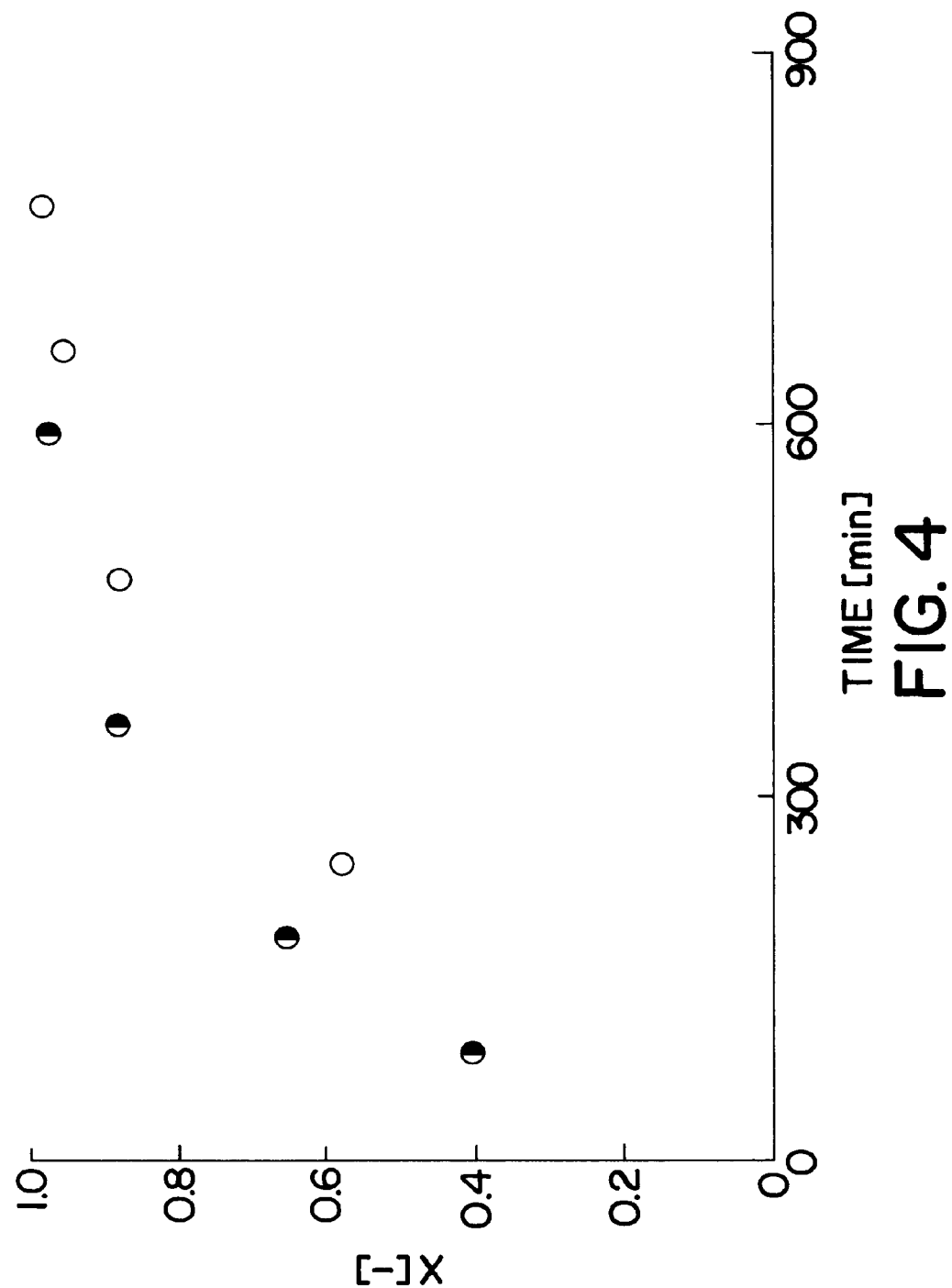

FIG. 4 shows that the conversion rate rises accompanied with rising the pressure.

EXAMPLE 6

The conditions of the hydrosilylation reaction were the same as that of Example 1 except using 50 ml of aliphatic hydrocarbon solvent heptane instead of 25 g hydrocarbonic plasticizer PS-32 (Idemitsu Kosan), containing 20.9% of oxygen content in vapor phase of the reactor instead of 8.0%. The conversion rate of the reaction is shown in FIG. 5.

EXAMPLES 7 TO 11

The experimental conditions were the same as that of comparative example 1 except adjusting the oxygen content of the vapor phase of the reactor to 11.6%, 8.0%, 3.6%, 0.36%, 0.05% respectively. The conversion rate of the reaction is shown in FIG. 5.

Figure 5:
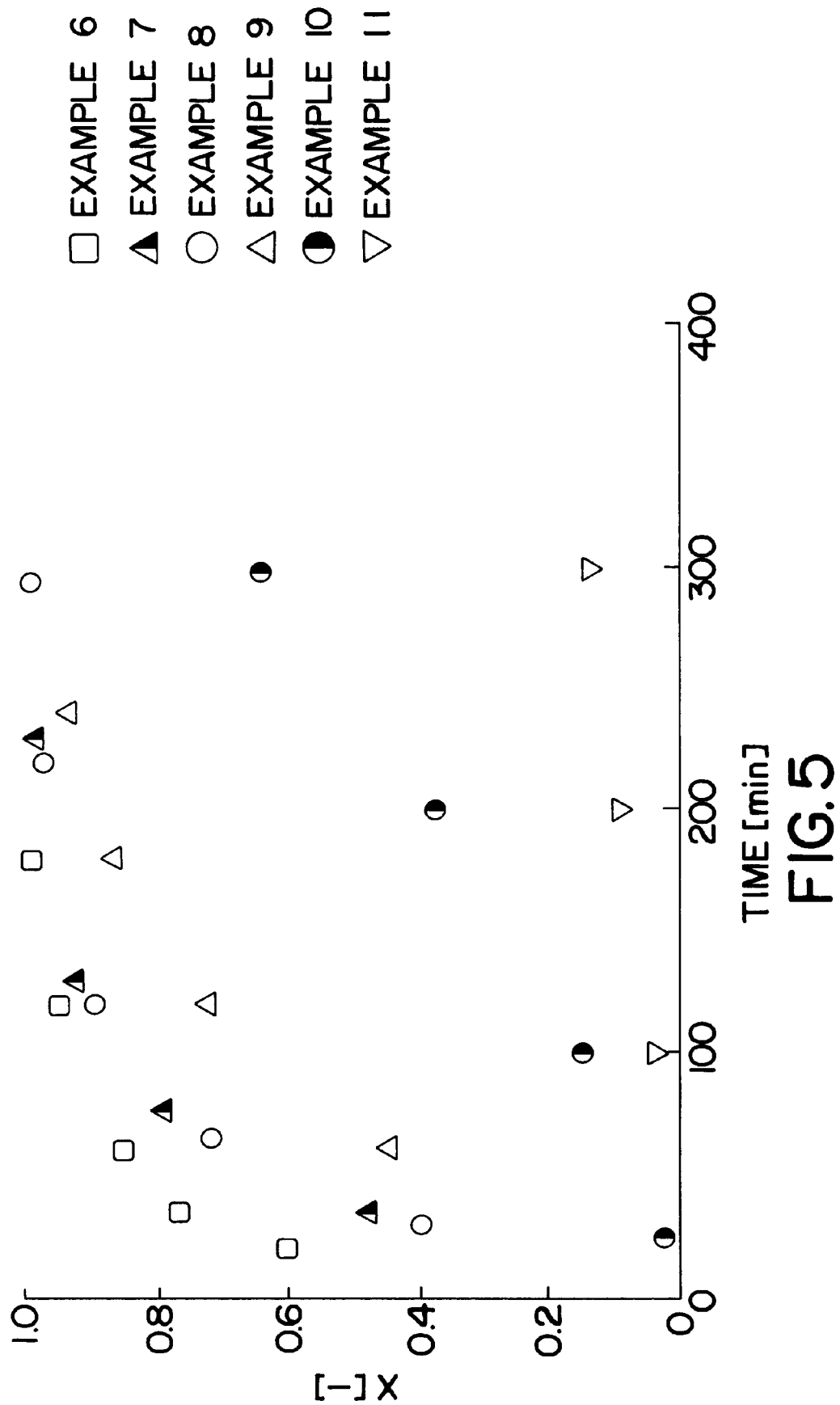

FIG. 5 shows that the reaction also proceeds in the case of using aliphatic hydrocarbon solvent as solvent, and that the conversion rate rises accompanied with rising the oxygen content.

EXAMPLE 12

The experimental conditions were the same as that of Example 1 except using chloroplatinic acid catalyst (isopropyl alcohol solution: 8.02×10$^{-5}$ mol/ml), adjusting the oxygen content of the vapor phase to 3.4%. The conversion rate is shown in FIG. 6.

EXAMPLE 13

The experimental conditions were the same as that of Example 1 except using chloroplatinic acid catalyst (8.02× 10$^{-5}$ mol/ml in isopropyl alcohol solution), adjusting the oxygen content of vapor phase to 20.9%. The conversion rate is shown in FIG. 6.

Figure 6:
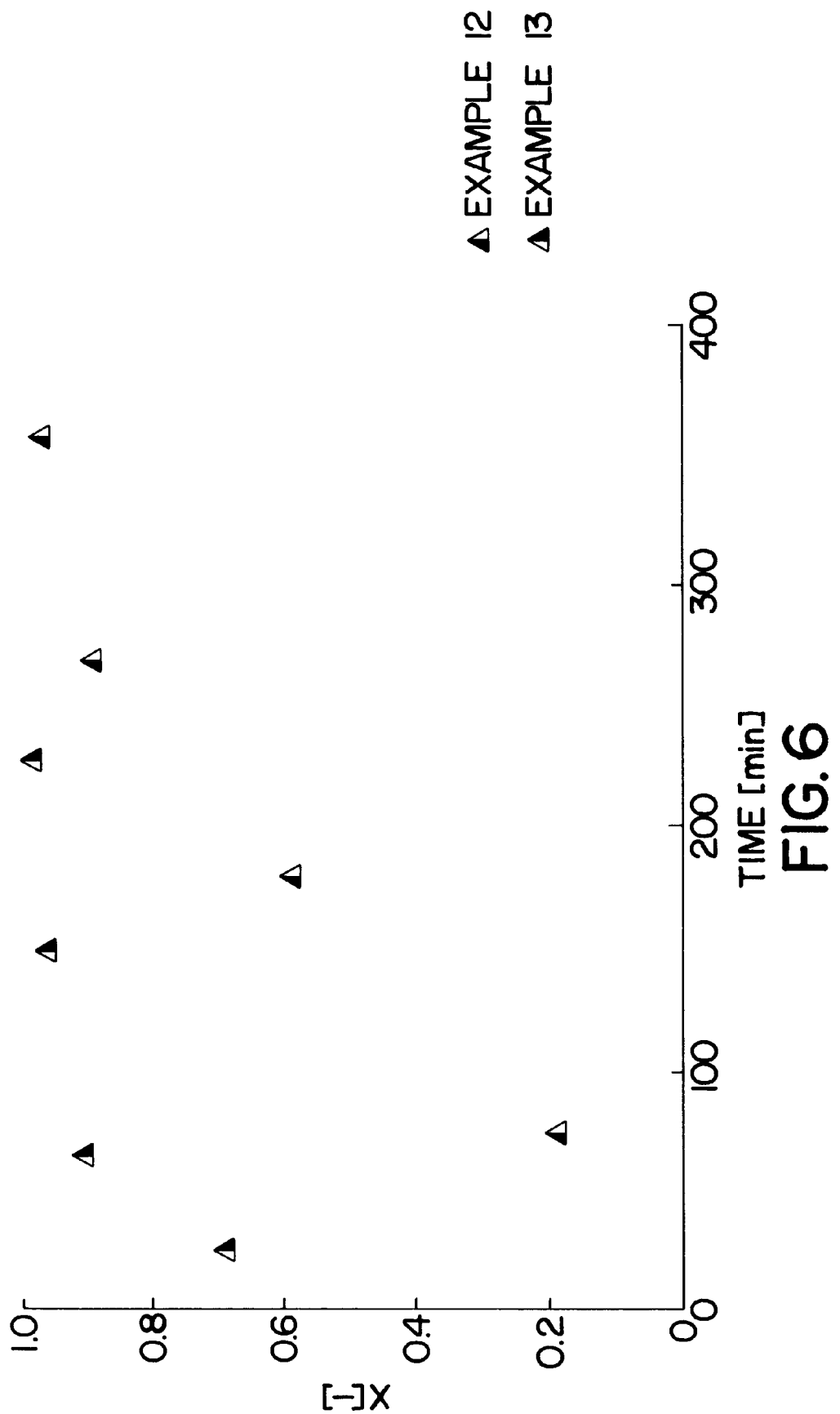

FIG. 6 shows that inorganic platinum compounds can be used to proceed hydrosilylation reaction.

EXAMPLE 14

Figure 7:
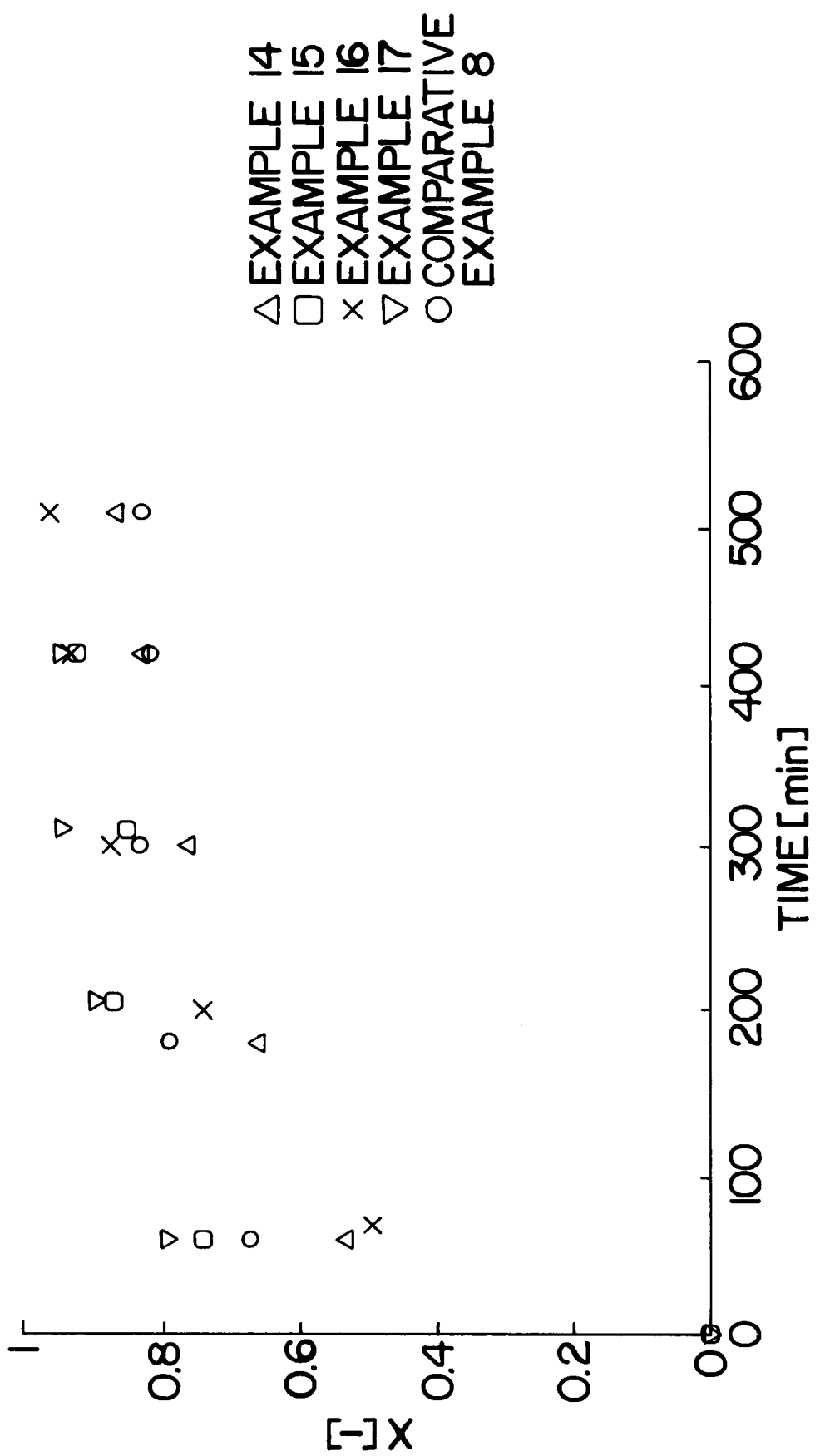
Figure 8:
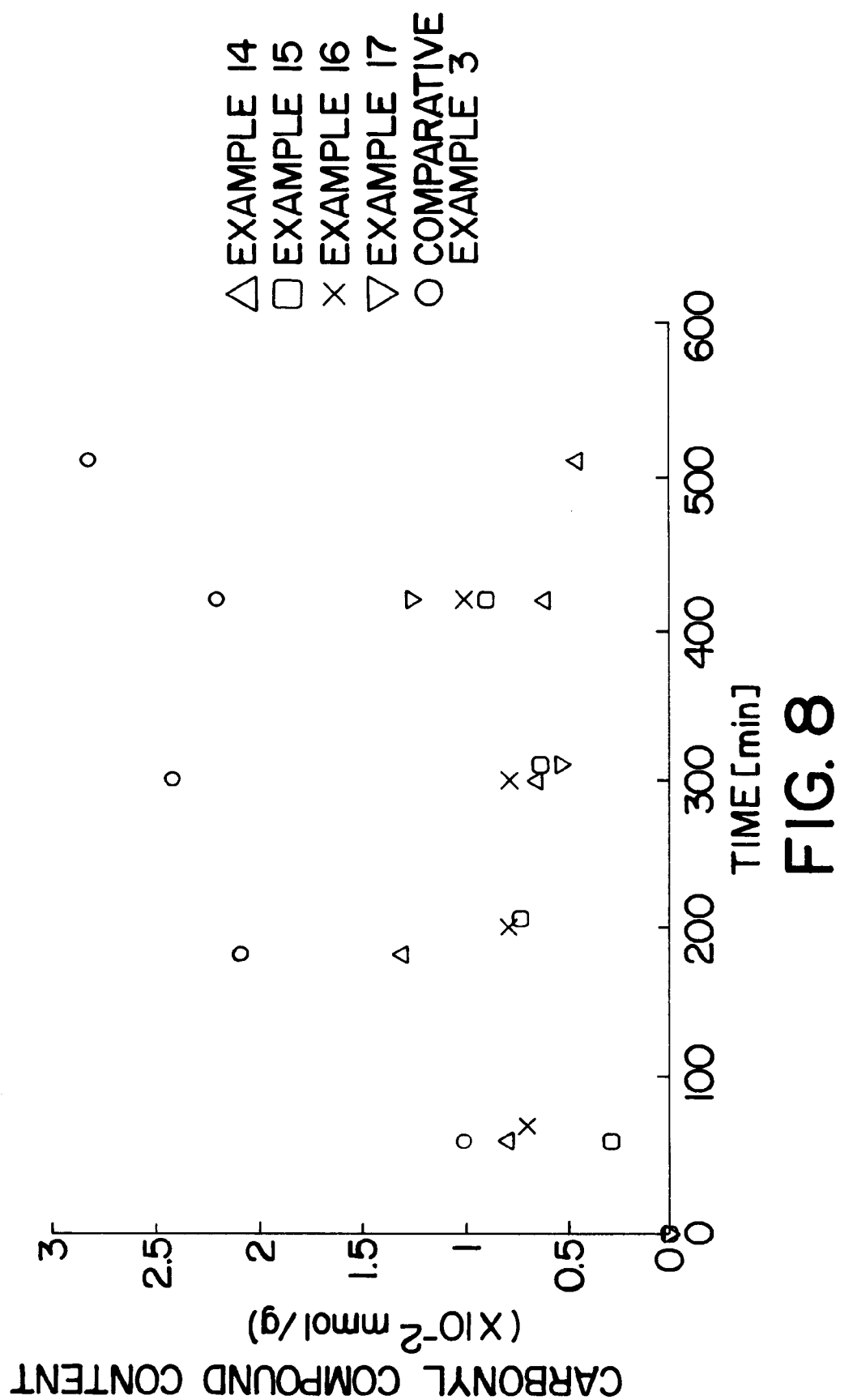

For effective mixing or reaction, 25.33 g of isobutylenic polymer containing vinyl groups at the proportion of about 95% at its ends, having a molecular weight of about 20,000 and 12.7 g (equals to 50 parts by weight to isobutylenic polymer) of plasticizer (PS-32) were added to a 300 ml, three-necked flask and they were mixed with agitation for 1 hour at about 75° C. under nitrogen atmosphere. Dimethoxymethylsilane (DMS, 0.81 g, 1.5 eq. to the vinyl group ends in isobutylenic polymer) was added to the reactor. After mixing satisfactorily, 0.025 g (equals to 0.1 part by weight to the polymer) of 2,6-di-tert-butyl-p-crezol (BHT) dissolved in xylene was added. The hydrosilylation reaction was started by addition of 1×10$^{-4}$ eq. (61.0 µL) of Pt-vinylsiloxane catalyst to vinyl group's mol amount. This reaction was conducted in air atmosphere. The conversion rate of the reaction and the rate of producing carbonyl compounds are shown in FIG. 7 and FIG. 8 respectively.

EXAMPLE 15

The experimental conditions were the same as that of Example 14 except using 22.18 g of isobutylenic polymer containing vinyl groups at its end, 11.1 g of plasticizer, 0.71 g of DMS, 53.4 µL of Pt-vinylsiloxane catalyst, 0.0067 g of BHT amount (0.03 parts by weight to the polymer). The conversion rate and the rate of producing carbonyl compounds are shown in FIG. 7 and FIG. 8 respectively.

EXAMPLE 16

The experimental conditions of hydrosilylation reaction were the same as those of Example 14 except using 23.35 g of isobutylenic polymer containing vinyl groups at its end, 11.7 g of plasticizer, 0.74 g of DMS, 56.3 µL of Pt-vinylsiloxane catalyst, 0.0023 g (equals to 0.01 parts by weight to polymer) of BHT. The conversion rate and the rate of producing carbonyl compounds are shown in FIG. 7 and FIG. 8 respectively.

EXAMPLE 17

The experimental conditions of hydrosilylation reaction was the same as those of Example 14 except using 21.07 g of isobutylenic polymer containing vinyl groups at its ends, 10.6 g of plasticizer, 0.67 g of DMS, 50.8 µL of Pt-vinylsiloxane catalyst, 0.001 g of BHT (equals to 0.005 part by weight to the polymer). The conversion and the rate of producing carbonyl compound are shown in FIG. 7, FIG. 8 respectively.

COMPARATIVE EXAMPLE 3

The experimental conditions were the same as those of Example 14 except using 25.03 g of isobutylenic polymer containing vinyl groups at its ends, 12.5 g of plasticizer, 0.80 g of DMS, 60.3 µL of Pt-vinylsiloxane catalyst, without BHT. The conversion and the rate of producing carbonyl compounds are shown in FIG. 7 and FIG. 8 respectively.

FIG. 7 shows that the conversion rate is improved by addition of antioxidant. However, in some case, the conversion rate can be low at the early stage of reaction in spite of addition of antioxidant. FIG. 8 shows that more carbonyl compounds are produced without antioxidant.

EXAMPLE 18

About 40 kg of isobutylene polymer containing vinyl groups in a proportion of about 95% at its ends, having a molecular weight of about 10,000 and 12 kg of PS-32 (Idemitsu Kosan) were added to the reactor of inside volume of 100 L and they were mixed and dissolved for 1 hour at inner temperature 110° C. under nitrogen atmosphere. To the reactor were added 2×10$^{-4}$ mol of platinum-vinylsiloxane complex catalyst per mol of vinyl group in isobutylene polymer (8.31×10$^{-6}$ mmol/µL in xylene solution) and 4 g of 2.6-di-tert-butyl phenol. With keeping agitation, air diluted with nitrogen was introduced into the reactor to adjust the oxygen content of vapor phase to 8%. The reaction was then started by introducing into the reactor through the dropping funnel 1.5 mol of dimethoxymethylsilane per mol of vinyl group in isobutylene polymer. Just after the reaction was started, the pressure in the vapor phase of the reactor was adjusted to 4 kg/cm$^2$G and the reaction was continued. At 17 hours after the reaction starts, the pressure in the vapor phase was turned to an atmospheric pressure, and was turned back to 4 kg/cm$^2$G with gas containing 8% of oxygen to continue the reaction. The conversion rate of the reaction is shown in FIG. 9.

EXAMPLE 19

The experimental conditions were the same as that of Example 18 except introducing 12 g of 2,6-di-tertbutylphenol into the reactor at the first step. In this case, gas displacement in vapor phase was conducted before the reaction starts and not during the reaction. The conversion rate of the reaction is shown in FIG. 9.

Figure 9:
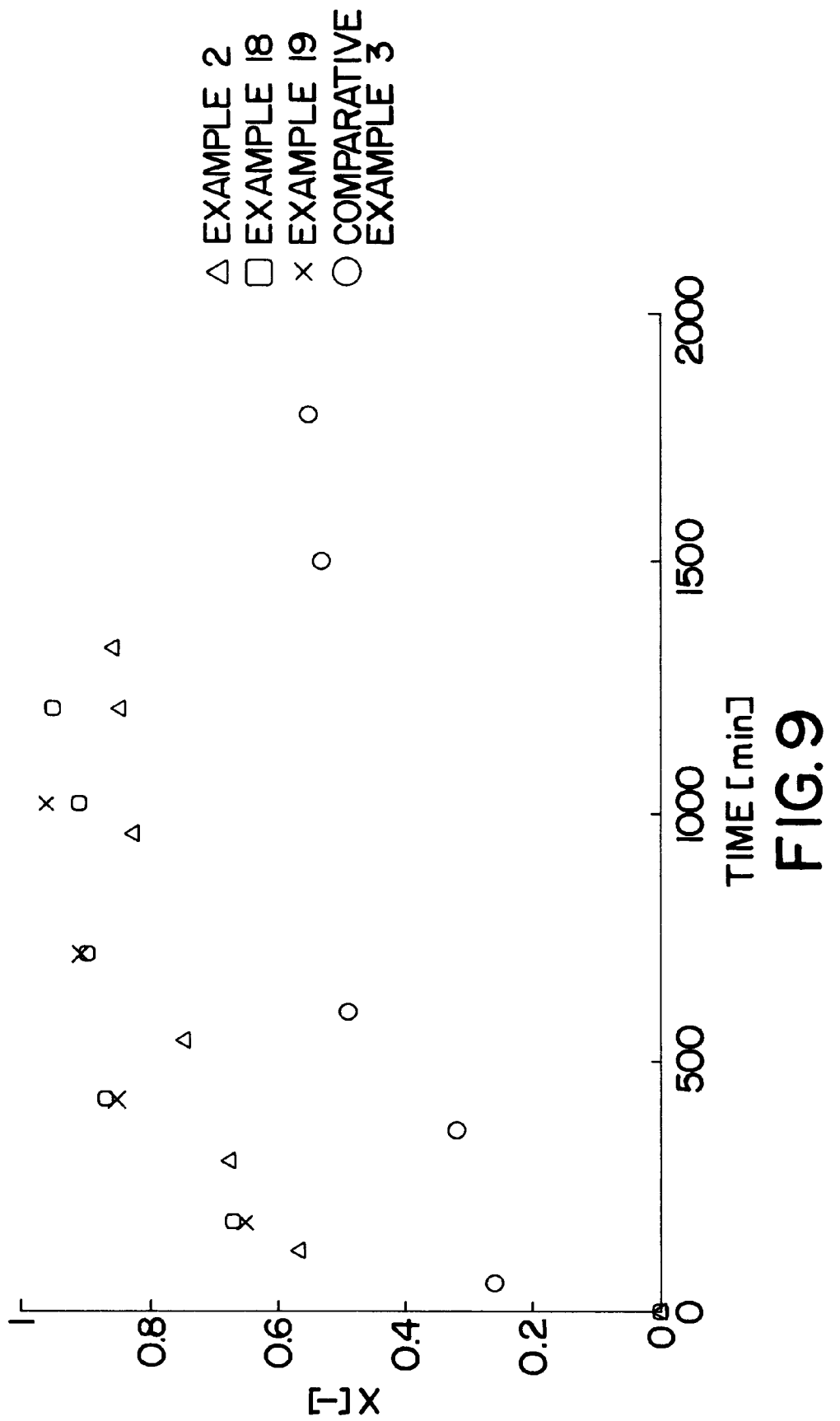

FIG. 9 shows that the conversion rate is improved by addition of antioxidant.

EXAMPLE 20

Figure 10:
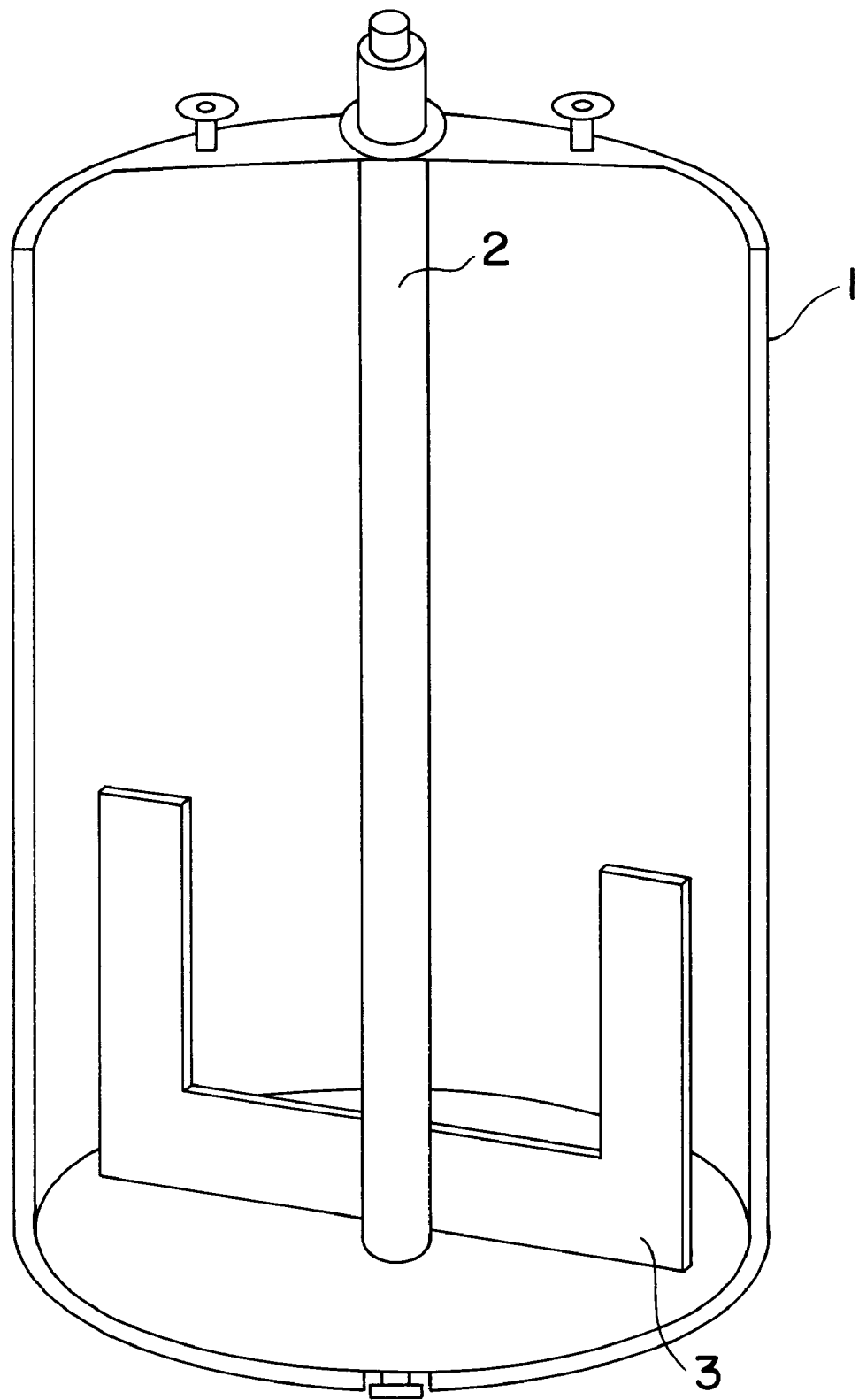
FIGS. 10 to 14 are stirrers used in the invention.

The agitation effect is shown with Example 20 to 23 and Comparative Examples 4 and 5. A four-necked separable flask is used for this experiment, which has an inner volume of 2 L and which is equipped with an impeller shown in FIG. 10. This impeller has a ratio of the impeller width to the inside diameter of the mixing vessel being 0.9 and a ratio of the projection area of the impeller to that of the mixing vessel being 0.39. To this flask were added about 750 g of isobutylene polymer containing vinyl groups at its ends in a proportion of about 95% and having a molecular weight of about 10,000 and 225 g of PS-32 (Idemitsu Kosan). They were then mixed and dissolved for 1 hour at an inner temperature of 75° C. under a nitrogen atmosphere. After introducing into the reactor $2 \times 10^{-4}$ mol of platinum-vinylsiloxane complex catalyst ($8.31 \times 10^{-6}$ mmol/$\mu$L in a xylene-diluted solution) per mol of vinyl groups contained in said isobutylene polymer, air diluted with nitrogen was introduced into the reactor to adjust the oxygen content of the vapor phase to 8%. Into the reactor was introduced through the dropping funnel 1.5 mol of dimethoxymethylsilane per mol of vinyl groups contained in said isobutylene polymer for starting the reaction.

EXAMPLE 21

Figure 11:
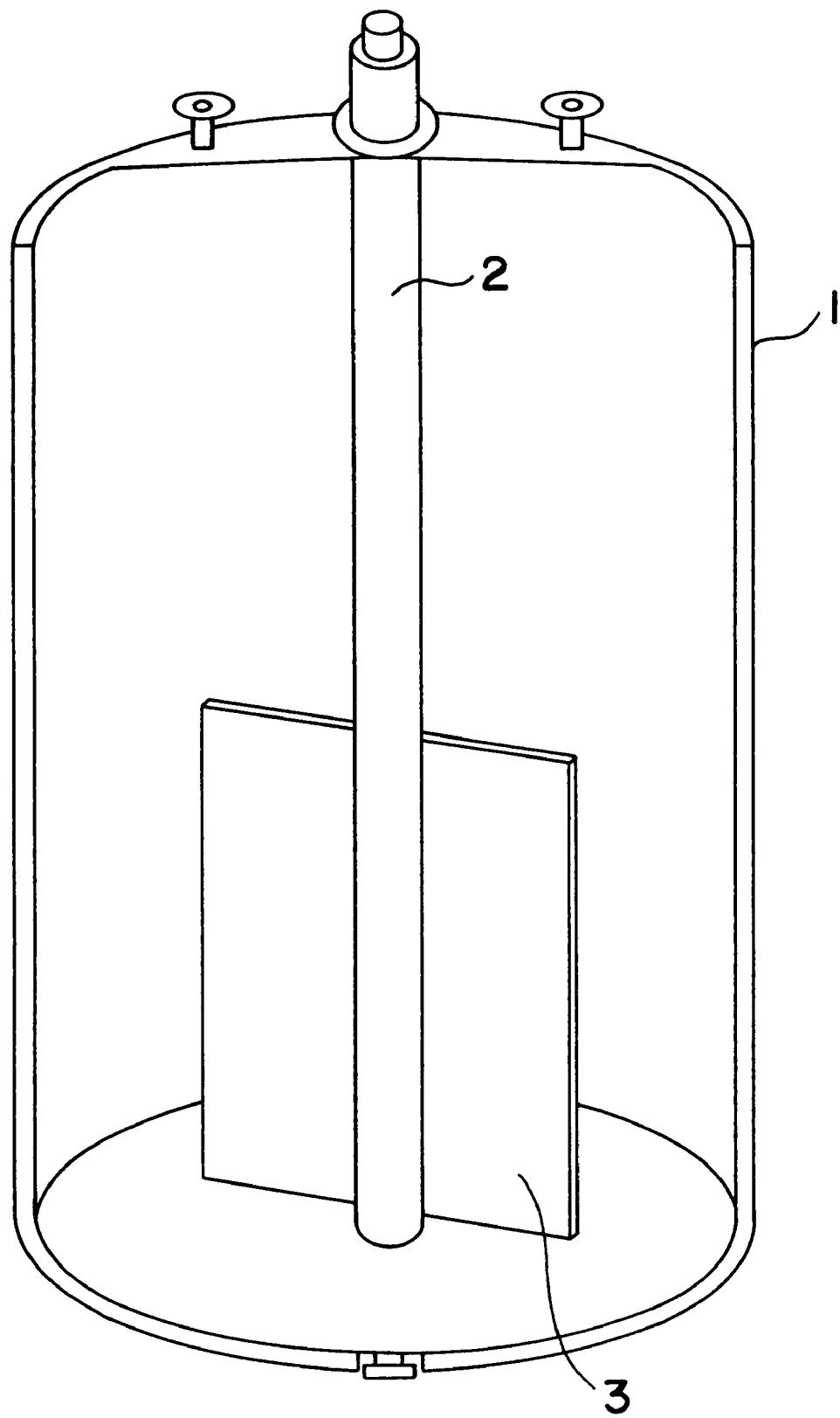

The experimental conditions are the same as those of Example 20 except using a four-necked separable flask which has an inner volume of 2 L and which is equipped with an impeller shown in FIG. 11. This impeller has a ratio of the impeller width to the inside diameter of the mixing vessel being 0.5 and a ratio of the projection area of the impeller to that of the mixing vessel being 0.51.

EXAMPLE 22

Figure 12:
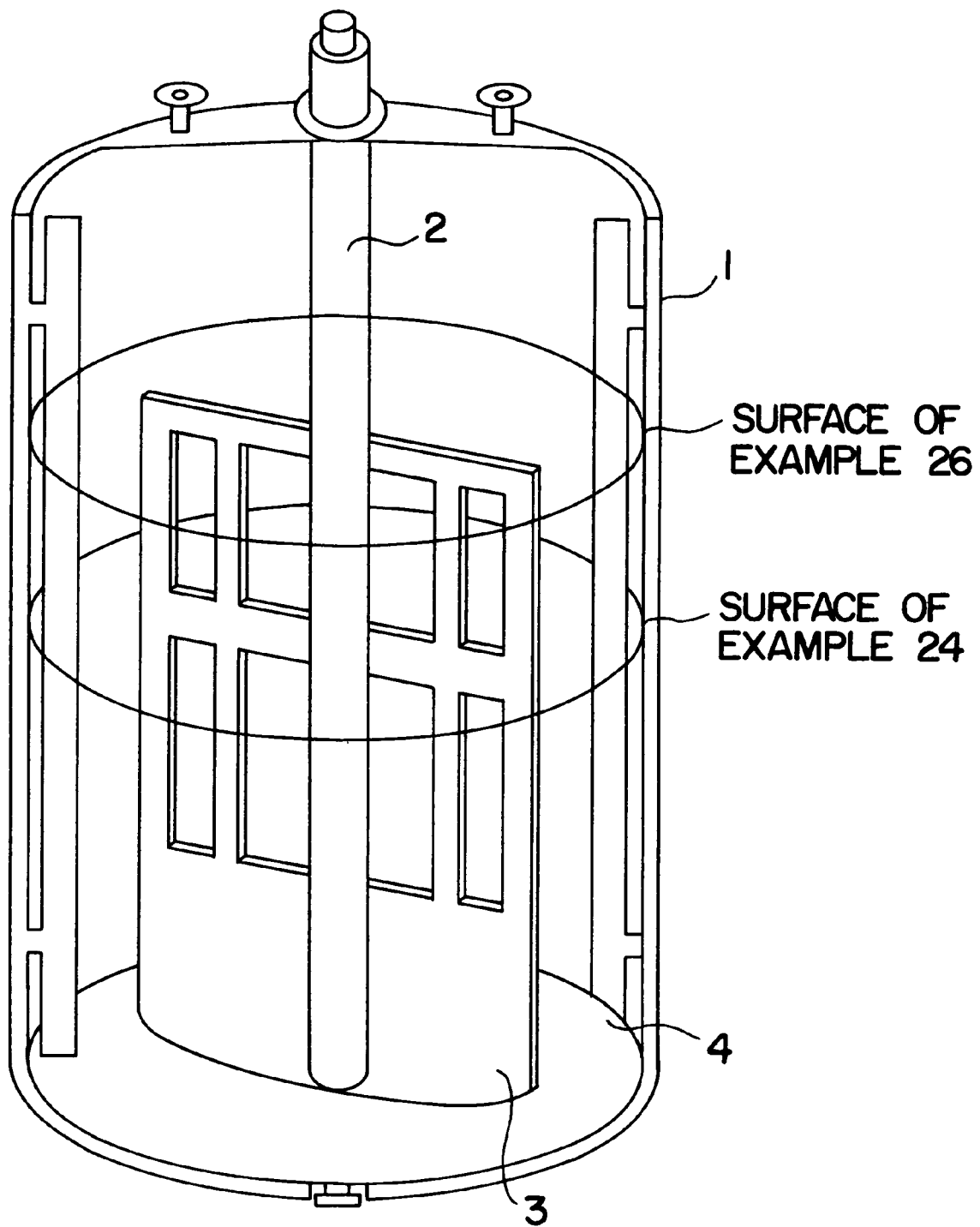

The experimental conditions are the same as Example 20 except using a four-necked separable flask which has an inner volume of 2 L and which is equipped with an impeller shown in FIG. 12. This impeller has a ratio of the impeller width to the inside diameter of the mixing vessel being 0.7 and a ratio of the projection area of the impeller to that of the mixing vessel being 0.41.

EXAMPLE 23

Figure 13:
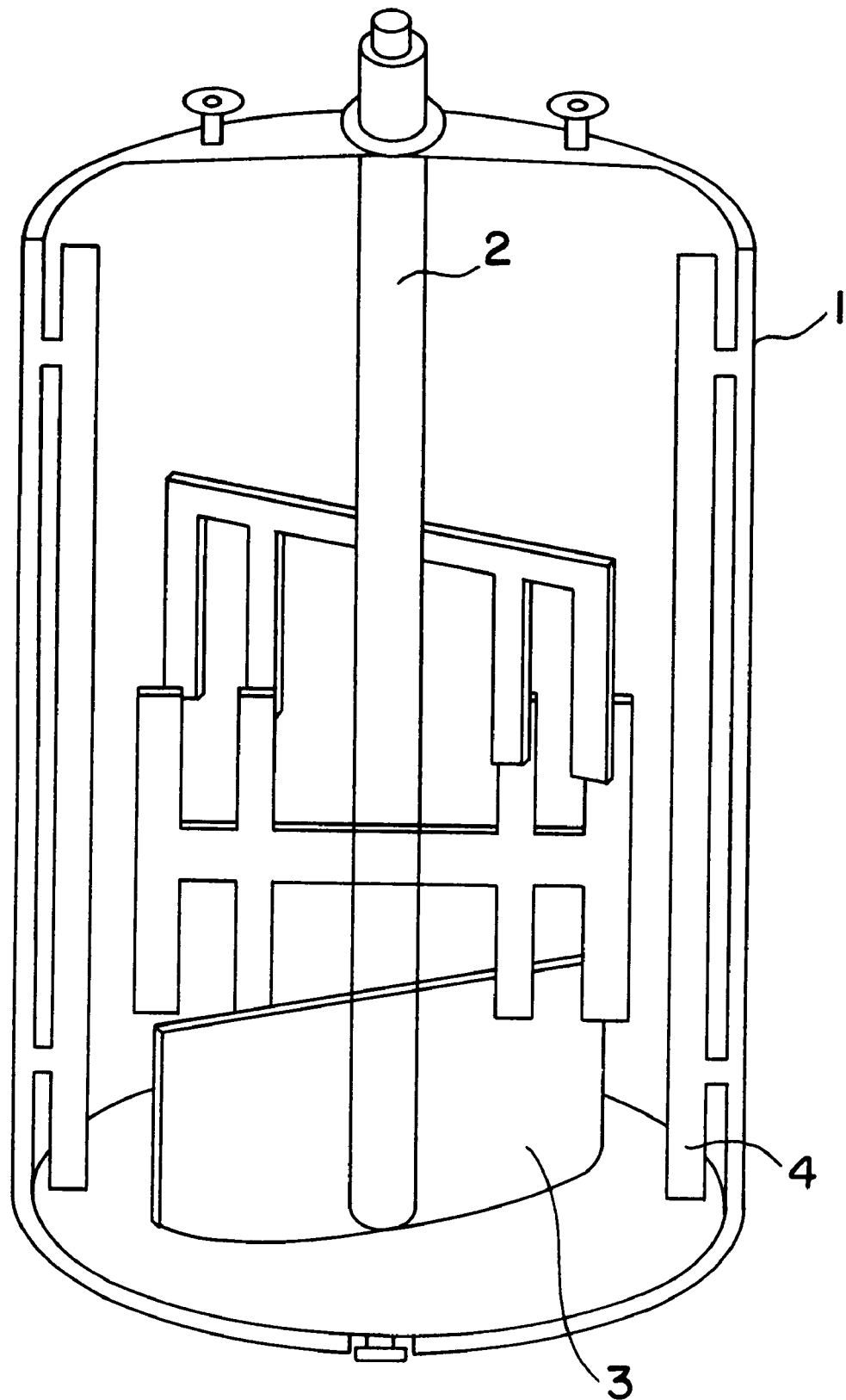

The experimental conditions are the same as those of Example 20 except using a four-necked separable flask which has an inner volume of 2 L and which is equipped with an impeller shown in FIG. 13. This impeller has a ratio of the impeller width to the inside diameter of the mixing vessel being 0.7 and a ratio of the projection area of the impeller to that of the mixing vessel being 0.43.

COMPARATIVE EXAMPLE 4

Figure 14:
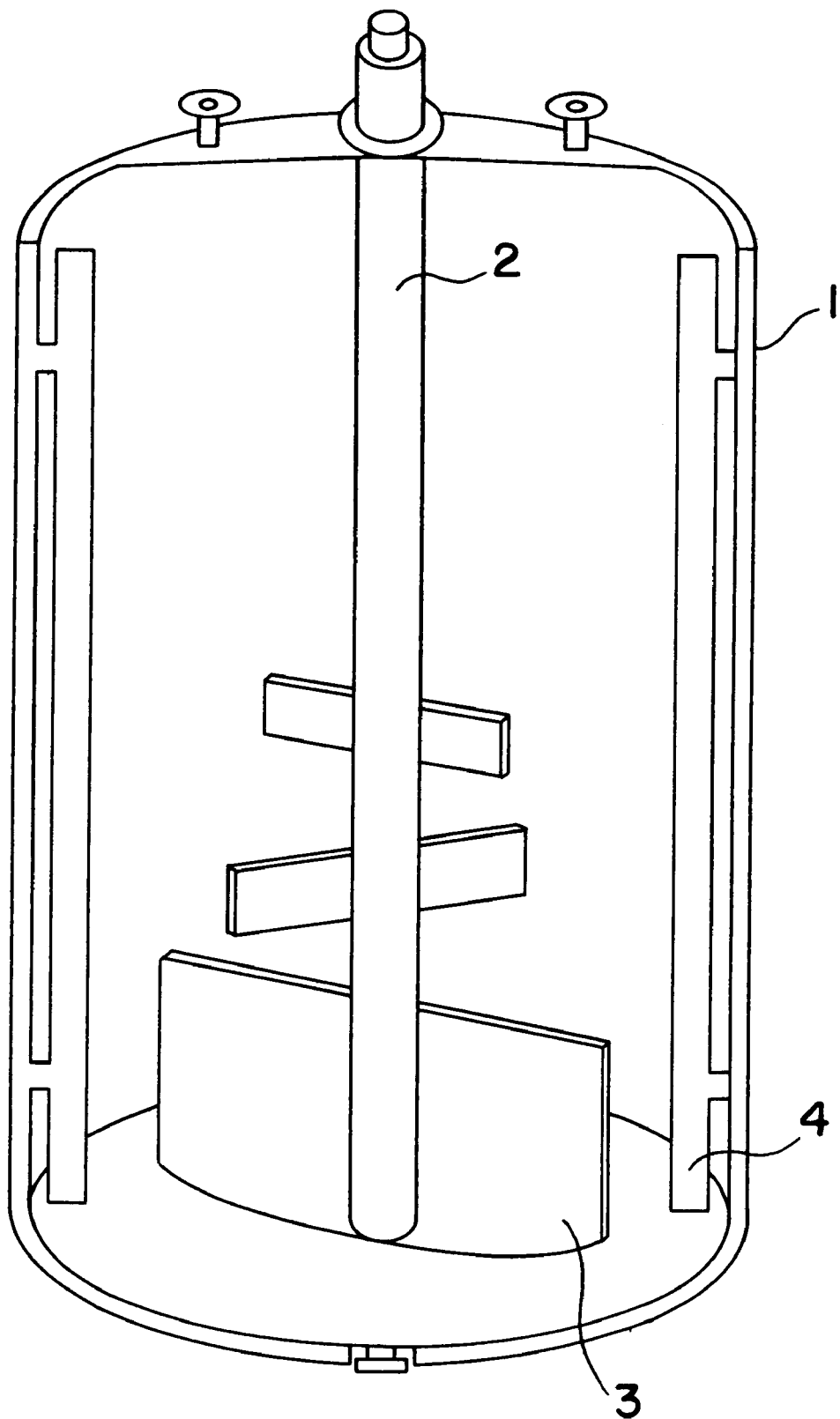

The experimental conditions are the same as those of Example 20 except using a four-necked separable flask which has an inner volume of 2 L and which is equipped with an impeller shown in FIG. 14. This impeller has a ratio of the impeller width to the inside diameter of the mixing vessel being 0.7 and a ratio of the projection area of the impeller to that of the mixing vessel being 0.29.

COMPARATIVE EXAMPLE 5

Figure 15:
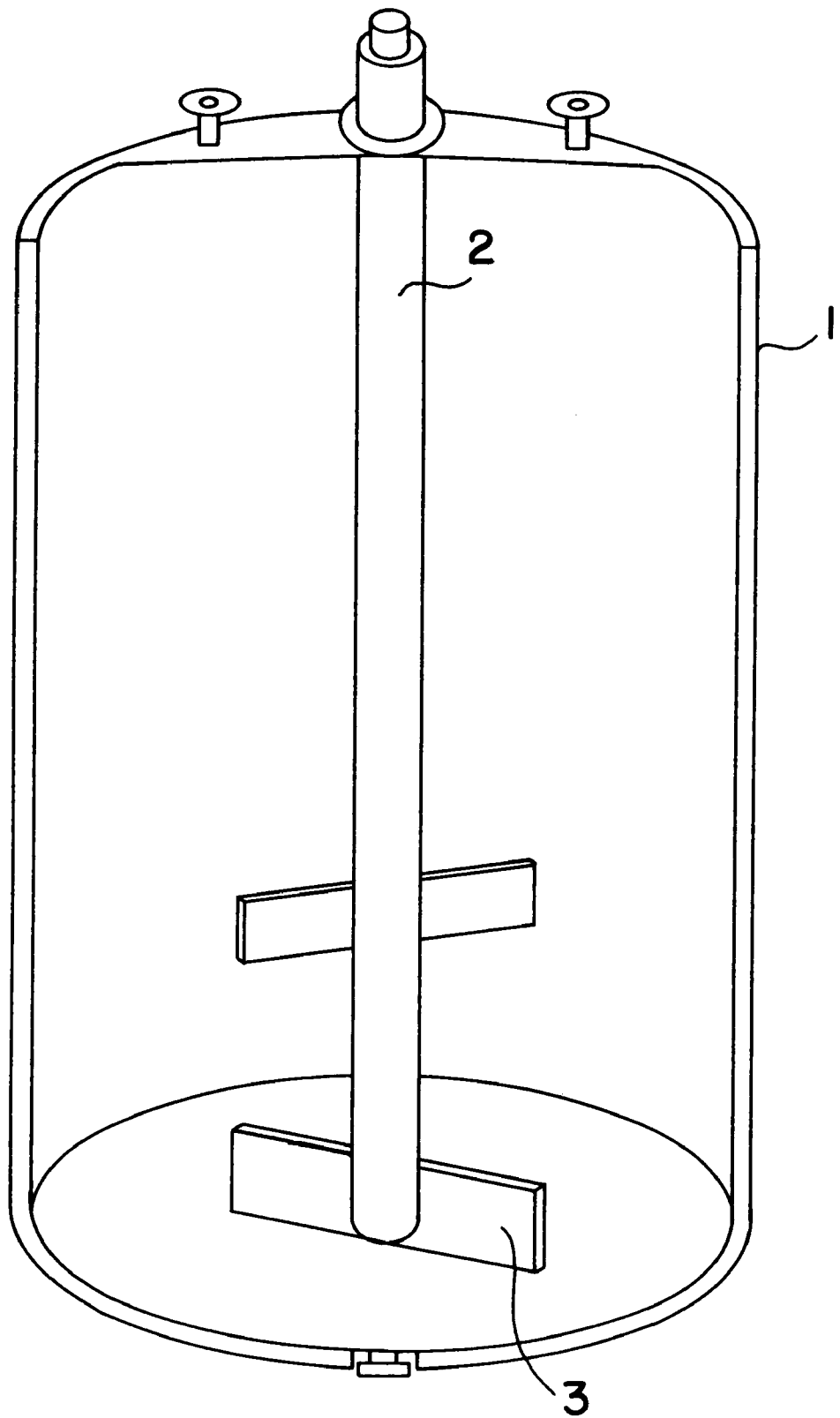
FIG. 15 is a stirrer used in Comparative Example.

The experimental conditions are the same as those of Example 20 except using a four-necked separable flask which has an inner volume of 2 L and which is equipped with an impeller shown in FIG. 15. This impeller has a ratio of the impeller width to the inside diameter of the mixing vessel being 0.5 and a ratio of the projection area of the impeller to that of the mixing vessel being 0.10.

Figure 16:
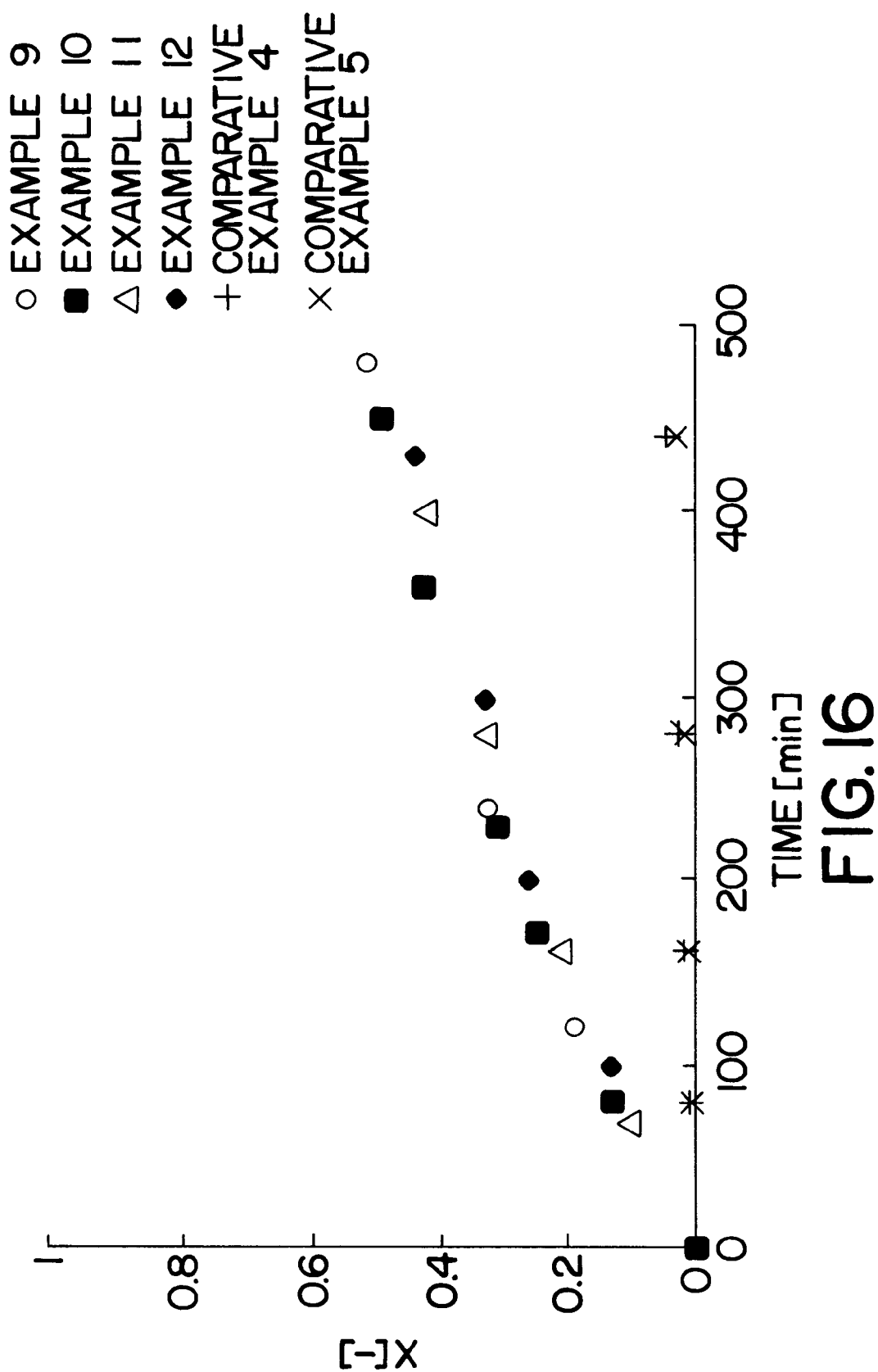
FIGS. 16 to 18 are graphs showing the relation of reaction time with conversion in various conditions.

The results of Examples 20 to 23 and Comparative Examples 4 and 5 are shown in FIG. 16.

FIG. 16 shows that the conversion rises by using the impeller according to the invention.

EXAMPLE 24

The stirring power effect is shown in Examples 24 to 25.

In these examples is used a four-necked separable flask which has an inner volume of 2 L and which is equipped with an impeller shown in FIG. 12. This impeller has a ratio of the impeller width to the inside diameter of the mixing vessel being 0.7 and the projection area of the impeller to that of the mixing vessel being 0.41. To said separable flask were added about 500 g of isobutylene polymer containing vinyl groups at its ends in a proportion of about 95% and having a molecular weight of 10,000 and 150 g of PS-32 (Idemitsu Kosan), and they were then mixed and dissolved for 1 hour at an inner temperature of 75° C. under an nitrogen atmosphere. After introducing into the reactor $2 \times 10^{-4}$ mol of platinum-vinylsiloxane complex catalyst ($8.31 \times 10^{-6}$ mmol/$\mu$L in an xylene-diluted solution) per mol of vinyl groups contained in said isobutylene polymer, nitrogen-diluted air was introduced into the reactor to adjust the oxygen content of the vapor phase to 8%. The power required for stirring was set to 6 kW/m$^3$, and 1.5 mol of dimethoxysilane per mol of vinyl group in isobutylene polymer was introduced into the reactor through the dropping funnel for starting the reaction. The power required for stirring was kept 6 kW/m$^3$ during the reaction. The surface position of the reaction solution was as described in FIG. 12

EXAMPLE 25

The experimental conditions are the same as those of Example 24 except setting the power required for stirring to 0.3 kW/m$^3$. The results of Examples 24 and 25 are shown in FIG. 17.

Figure 17:
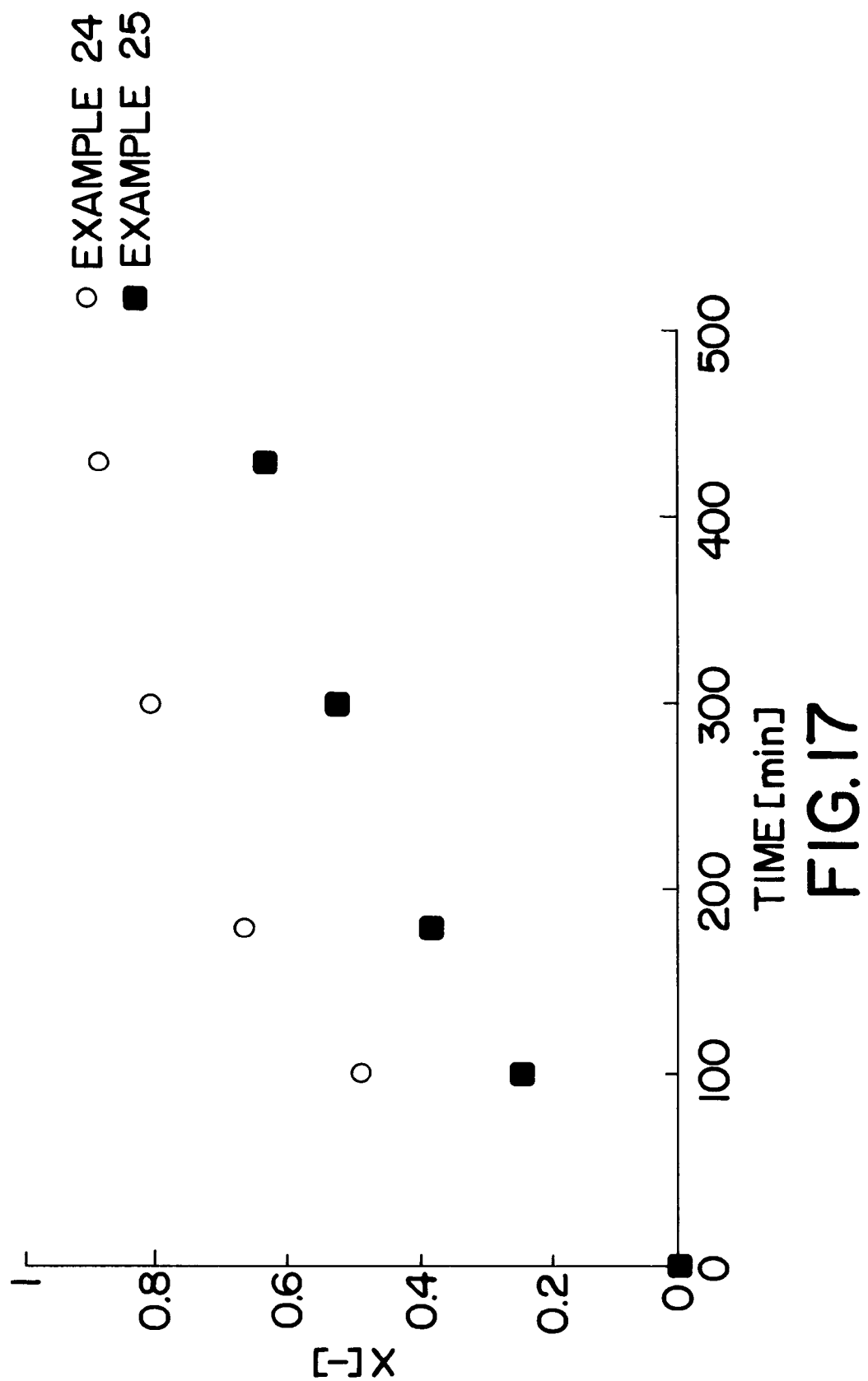

FIG. 17 shows that the conversion goes high accompanied with intensifying agitation. The surface position effect of the reaction solution against the upper end of the impeller was examined in the next example.

EXAMPLE 26

The effect of the surface position of the reaction solution is Shown in Examples 26 and 24.

The experimental conditions are the same as those of Example 24 except using about 750 g of isobutylene polymer and 225 g of PS-32 (Idemitsu Kosan). The surface position of the reaction solution was as described in FIG. 12. The results of Example 24 and 26 are shown in FIG. 18.

Figure 18:
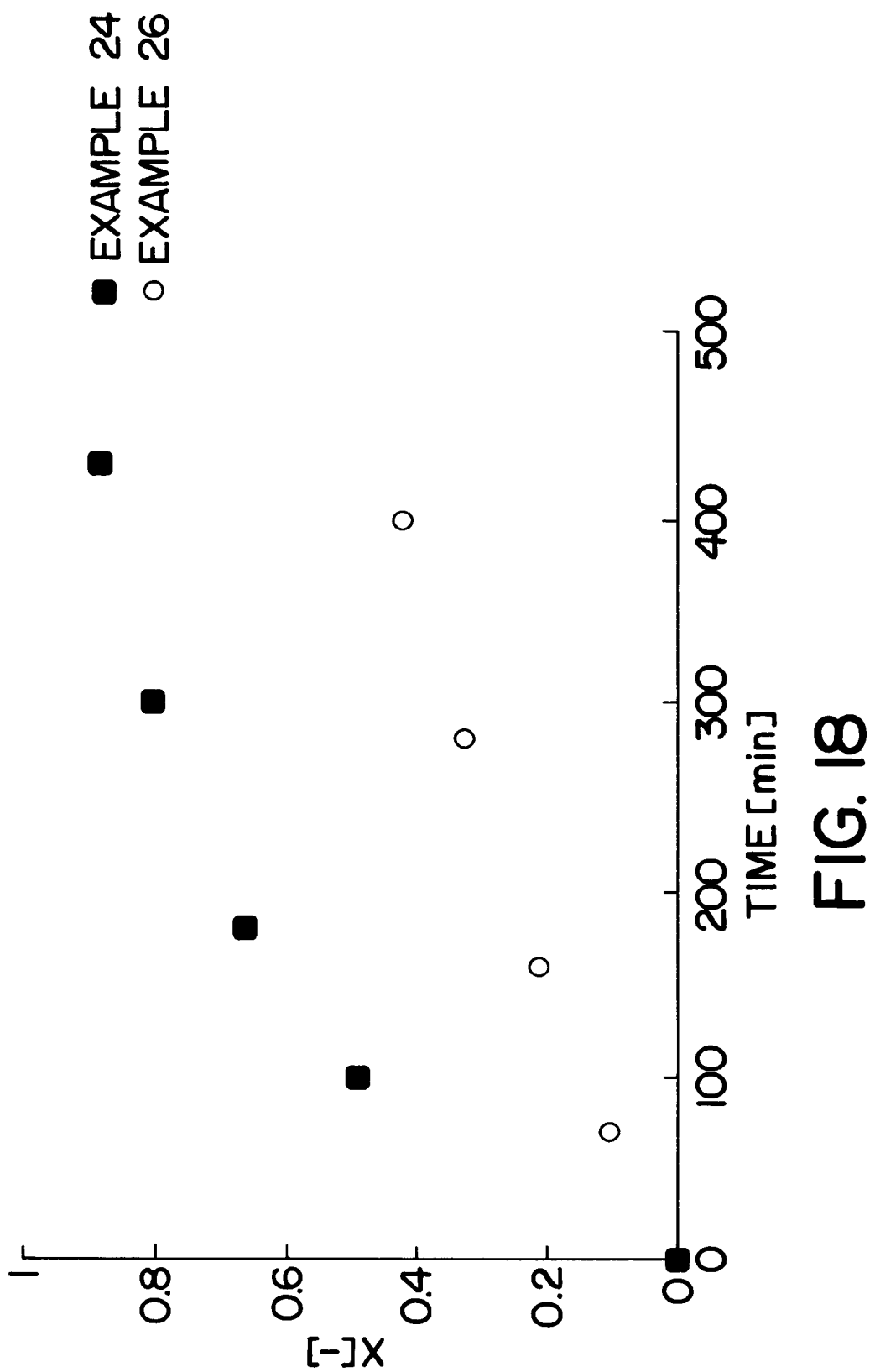
Figure 19:
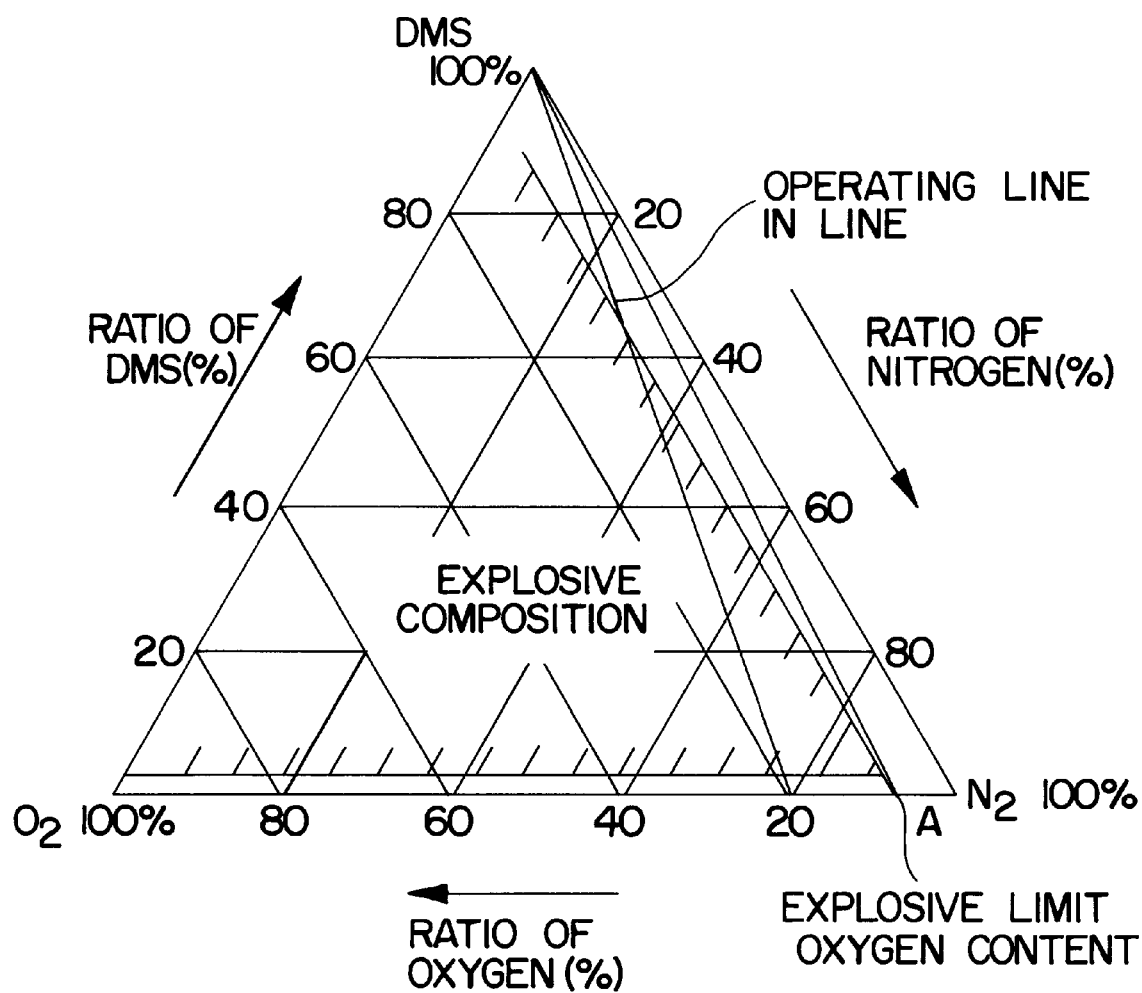
FIGS. 19 to 20 are graphs showing the explosive limit oxygen content.
Figure 20:
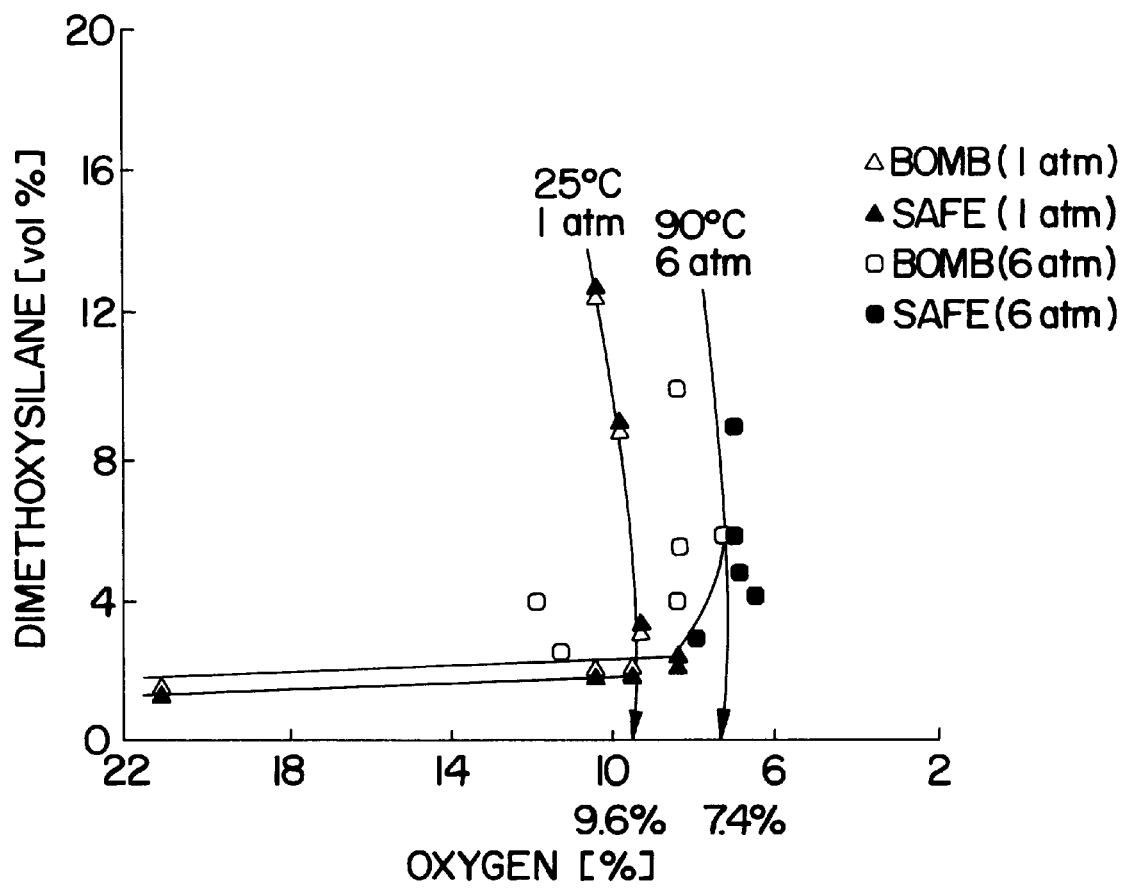

FIG. 18 shows that the conversion goes high when the surface of the reaction solution is under the upper end of the impeller.

What is claimed is:

1. A process, having improved yield, for preparing an organic polymer having silicon-containing groups by subjecting a polymer having an unsaturated group(s) to a hydrosilylation reaction with a hydrosilicon compound, which comprises mixing the polymer having unsaturated groups with a solvent in the presence of an inert gas to keep the polymer and solvent in an inert gas atmosphere before the hydrosilylation reaction, and introducing oxygen into the reactor just before starting the reaction, wherein the solvent is a petrolic softening agent with a molecular weight of 200 to 800.

2. The process according to claim 1, wherein the polymer having unsaturated groups is a saturated hydrocarbon polymer.

3. The process according to claim 1, wherein the polymer having unsaturated groups is a polyisobutylene.

4. The process according to claim 1, wherein the hydrosilicon compound is a compound represented by the general formula (1):

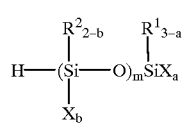

wherein $R^1$ and $R^2$ each represent an alkyl group containing 1 to 20 carbon atoms, an aryl group containing 6 to 20 carbon atoms or $(R')_3SiO-$ wherein R' is a monovalent hydrocarbon group containing 1 to 20 carbon atoms and three R's may be the same or different; X is a hydroxyl group, a hydrogen atom or a hydrolyzable group, wherein two or more Xs are bound to the Si atom, they may be the same or different; a is 0, 1, 2 or 3; b is 0, 1 or 2; and m is an integer of 0 to 18.

5. The process of claim 4 wherein the hydrolyzable group is a member selected from the group consisting of a halogen, an alkoxy, and an acyloxy group.

6. The process according to claim 1, wherein the petrolic softening agent is a paraffinic plasticizer and/or a plasticizer comprising 50 to 90% paraffin, 10 to 50% naphthene, and 1% or less aroma by n-d-M method.

7. The process of claim 6 wherein the softening agent comprises 50 to 90% paraffin, 10 to 50% naphthene, and 1% or less aroma by n-d-M method.

8. The process according to claim 1, wherein a solvent compatible with the polymer is used in an amount of 0.1 to 500 parts by weight relative to the polymer.

* * * * *